(12) United States Patent
Jiao et al.

(10) Patent No.: US 11,630,671 B1
(45) Date of Patent: Apr. 18, 2023

(54) CIRCULAR BUFFER ACCESSING DEVICE, SYSTEM AND METHOD

(71) Applicants: STMICROELECTRONICS (BEIJING) R&D CO., LTD., Beijing (CN); STMICROELECTRONICS S.r.l., Agrate Brianza (IT)

(72) Inventors: Xiao Kang Jiao, Beijing (CN); Fabio Giuseppe De Ambroggi, Biassono (IT)

(73) Assignees: STMICROELECTRONICS (BEIJING) R&D CO., LTD., Beijing (CN); STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/581,601

(22) Filed: Jan. 21, 2022

(51) Int. Cl.
  *G06F 9/30* (2018.01)
  *G06F 9/38* (2018.01)
  *G06F 9/355* (2018.01)

(52) U.S. Cl.
  CPC .......... *G06F 9/3814* (2013.01); *G06F 9/3013* (2013.01); *G06F 9/30105* (2013.01); *G06F 9/355* (2013.01)

(58) Field of Classification Search
  CPC .. G06F 9/3814; G06F 9/30105; G06F 9/3013; G06F 9/355
  See application file for complete search history.

(56) References Cited

U.S. PATENT DOCUMENTS

| | | | |
|---|---|---|---|
| 5,416,847 A | 5/1995 | Boze | |
| 5,528,528 A * | 6/1996 | Bui | H04N 19/60 375/E7.14 |
| 6,363,470 B1 * | 3/2002 | Laurenti | G06F 9/3891 712/E9.019 |
| 6,665,695 B1 | 12/2003 | Brokish et al. | |
| 6,665,696 B2 | 12/2003 | Brokish | |
| 7,152,087 B2 | 12/2006 | Choi et al. | |
| 8,117,248 B2 | 2/2012 | Dobbek et al. | |
| 2006/0075208 A1 * | 4/2006 | Jones | G06F 9/30181 712/E9.043 |
| 2019/0005656 A1 * | 1/2019 | Sanghvi | G06T 7/246 |
| 2021/0135787 A1 * | 5/2021 | Sengupta | H04L 1/0045 |

OTHER PUBLICATIONS

Chen et al.; Accelerating MapReduce on a Coupled CPU-GPU Architecture; IEEE; 2012 (Year: 2012).*

* cited by examiner

*Primary Examiner* — Corey S Faherty
(74) *Attorney, Agent, or Firm* — Seed Intellectual Property Law Group LLP

(57) ABSTRACT

A device includes a circular buffer, which, in operation, is organized into a plurality of subsets of buffers, and control circuitry coupled to the circular buffer. The control circuitry, in operation, receives a memory load command to load a set of data into the circular buffer. The memory load command has an offset parameter indicating a data offset and a subset parameter indicating a subset of the plurality of subsets into which the circular buffer is organized. The control circuitry responds to the command by identifying a set of buffer addresses of the circular buffer based on a value of the offset parameter and a value of the subset parameter, and loading the set of data into the circular buffer using the identified set of buffer addresses.

49 Claims, 16 Drawing Sheets

|  | Address 0x0 | Address 0x4 | Address 0x8 | Address 0xC |
|---|---|---|---|---|
| address 0x10 | x[0] | x[1] | x[2] | x[3] |
| address 0x20 | x[4] | x[5] | x[6] | x[7] |
| address 0x30 | x[8] | x[9] | x[10] | x[11] |
|  | ⋮ | ⋮ | ⋮ | ⋮ |
|  | ⋮ | ⋮ | ⋮ | ⋮ |
|  | x[N−4] | x[N−3] | x[N−2] | x[N−1] |
|  |  |  |  |  |
|  | b[7] | b[6] | b[5] | b[4] |
|  | b[3] | b[2] | b[1] | b[0] |

*FIG. 6*

CIRCULAR BUFFER ACCESSING DEVICE, SYSTEM AND METHOD

BACKGROUND

Technical Field

The present disclosure generally relates to using a circular buffer to perform processing operations, such as iterative processing operations.

Description of the Related Art

A processing system, such as an embedded processor, may frequently perform iterative processing operations. For example, the least-mean-square (LMS) processing algorithm is an iterative algorithm and is the most widely used adaptive filter algorithm in fields like control systems, adaptive channel equalization, adaptive beamforming, etc.

An N tap LMS adaptive finite impulse response (FIR) filter, for example, may be implemented iteratively using three steps. In a first step, a FIR calculation may be performed, for example, according to:

$$y[n] = \sum_{k=0}^{N-1}(b_n(k) * x(n-k)),$$

where x is the input signal, and b is the coefficient of the FIR filter. Next, an error calculation is performed, for example, according to:

$$e_n = r[n] - y[n],$$

where r is the desired signal. The third iterative step is to update the FIR coefficients, for example, according to:

$$b_{n+1}(k) = b_n(k) + e_n * x(n-k), k=0,1,\ldots,N-1.$$

The performance and the power consumption of iterative operations, such as the widely used LMS adaptive FIR filter, is a consideration for microcontrollers (MCUs), digital signal processors (DSPs), especially embedded processors, and the like. Such processing systems may often be implemented as a system on a chip (SOC).

BRIEF SUMMARY

In an embodiment, a device comprises a circular buffer, which, in operation, is organized into a plurality of subsets of buffers, and control circuitry coupled to the circular buffer. The control circuitry, in operation, responds to receipt of a memory load command to load a set of data into the circular buffer, the memory load command having an offset parameter indicating a data offset and a subset parameter indicating a subset of the plurality of subsets into which the circular buffer is organized, by: identifying a set of buffer addresses of the circular buffer based on a value of the offset parameter and a value of the subset parameter; and loading the set of data into the circular buffer using the identified set of buffer addresses.

In an embodiment, a system comprises a processing core, and a memory coupled to the processing core. The memory has a set of registers, which, in operation, are organized into a circular buffer having a plurality of subset of buffers. The memory, in operation responds to receipt of a memory load command from the processing core to load a set of data into the circular buffer, the memory load command having an offset parameter indicating a data offset and a subset parameter indicating a subset of the plurality of subsets of buffers into which the circular buffer is organized, by: identifying a set of buffer addresses of the circular buffer based on a value of the offset parameter and a value of the subset parameter; and loading the set of data into the circular buffer using the identified set of buffer addresses.

In an embodiment, a method comprises organizing a circular buffer into a plurality of subsets of buffers and executing a memory load command to load a set of data into the circular buffer. The memory load command has an offset parameter indicating a data offset and a subset parameter indicating a subset of the plurality of subsets into which the circular buffer is organized. The executing the memory load command includes identifying a set of buffer addresses of the circular buffer based on a value of the offset parameter and a value of the subset parameter, and loading the set of data into the circular buffer using the identified set of buffer addresses.

In an embodiment, a non-transitory computer-readable medium's contents configure a processing device to perform a method. The method comprises organizing a circular buffer into a plurality of subsets of buffers, and executing a memory load command to load a set of data into the circular buffer. The memory load command has an offset parameter indicating a data offset and a subset parameter indicating a subset of the plurality of subsets into which the circular buffer is organized. The executing the memory load command includes identifying a set of buffer addresses of the circular buffer based on a value of the offset parameter and a value of the subset parameter, and loading the set of data into the circular buffer using the identified set of buffer addresses.

In an embodiment, a method comprises organizing a circular buffer into a plurality of subsets of buffers, and filtering a sequence of data samples. The filtering includes iteratively: generating an error signal, executing a load command to load a subset of data of the sequence of data into the circular buffer, updating filter coefficients based on data stored in the circular buffer, and generating an output signal based on data stored in the circular buffer. The load command has an offset parameter indicating a data offset and a subset parameter indicating a subset of the plurality of subsets into which the circular buffer is organized. The executing the load command includes identifying a set of buffer addresses of the circular buffer based on a value of the offset parameter and a value of the subset parameter, and loading the subset of data of the sequence of data into the circular buffer using the identified set of buffer addresses.

In an embodiment, a device comprises: memory and processing circuitry coupled to the memory. The processing circuitry, in operation, organizes the memory into a circular buffer having a plurality of subsets of buffers and filters a sequence of data samples. The filtering includes iteratively: generating an error signal; executing a load command to load a subset of data samples of the sequence of data samples into the circular buffer, the load command having an offset parameter indicating a data offset and a subset parameter indicating a subset of the plurality of subsets into which the circular buffer is organized, the executing the load command including: identifying a set of buffer addresses of the circular buffer based on a value of the offset parameter and a value of the subset parameter; and loading the subset of data samples of the sequence of data samples into the circular buffer using the identified set of buffer addresses; updating filter coefficients based on data samples stored in the circular buffer; and generating an output signal based on data samples stored in the circular buffer.

In an embodiment, a system comprises a processing core and a memory coupled to the processing core, the memory having a set of registers. The processing core, in operation: organizes the set of registers into a circular buffer having a plurality of subsets of buffers and filters a sequence of data samples. The filtering includes iteratively: generating an error signal; executing a load command to load a subset of data samples of the sequence of data samples into the circular buffer, the load command having an offset parameter indicating a data offset and a subset parameter indicating a subset of the plurality of subsets into which the circular buffer is organized, the executing the load command including: identifying a set of buffer addresses of the circular buffer based on a value of the offset parameter and a value of the subset parameter; and loading the subset of data samples of the sequence of data samples into the circular buffer using the identified set of buffer addresses; updating filter coefficients based on data samples stored in the circular buffer; and generating an output signal based on data samples stored in the circular buffer.

In an embodiment, a non-transitory computer-readable medium's contents configure a processing device to perform a method, the method, comprising: organizing a circular buffer into a plurality of subsets of buffers; and filtering a sequence of data samples, the filtering including iteratively: generating an error signal; executing a load command to load a subset of data samples of the sequence of data samples into the circular buffer, the load command having an offset parameter indicating a data offset and a subset parameter indicating a subset of the plurality of subsets into which the circular buffer is organized, the executing the load command including: identifying a set of buffer addresses of the circular buffer based on a value of the offset parameter and a value of the subset parameter; and loading the subset of data samples of the sequence of data into the circular buffer using the identified set of buffer addresses; updating filter coefficients based on data samples stored in the circular buffer; and generating an output signal based on data samples stored in the circular buffer.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. Moreover, some elements known to those of skill in the art have not been illustrated in the drawings for ease of illustration. One or more embodiments are described hereinafter with reference to the accompanying drawings in which:

FIG. 6 is a conceptual diagram illustrating an example data set associated with an N tap LMS adaptive FIR filter.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to interfaces, power supplies, physical component layout, processing cores, non-volatile memories, memory controllers, circular buffers, etc., have not been shown or described in order to avoid unnecessarily obscuring descriptions of the embodiments. Additionally, the various embodiments may be methods, systems, or devices.

Throughout the specification, claims, and drawings, the following terms take the meaning explicitly associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figure 1:
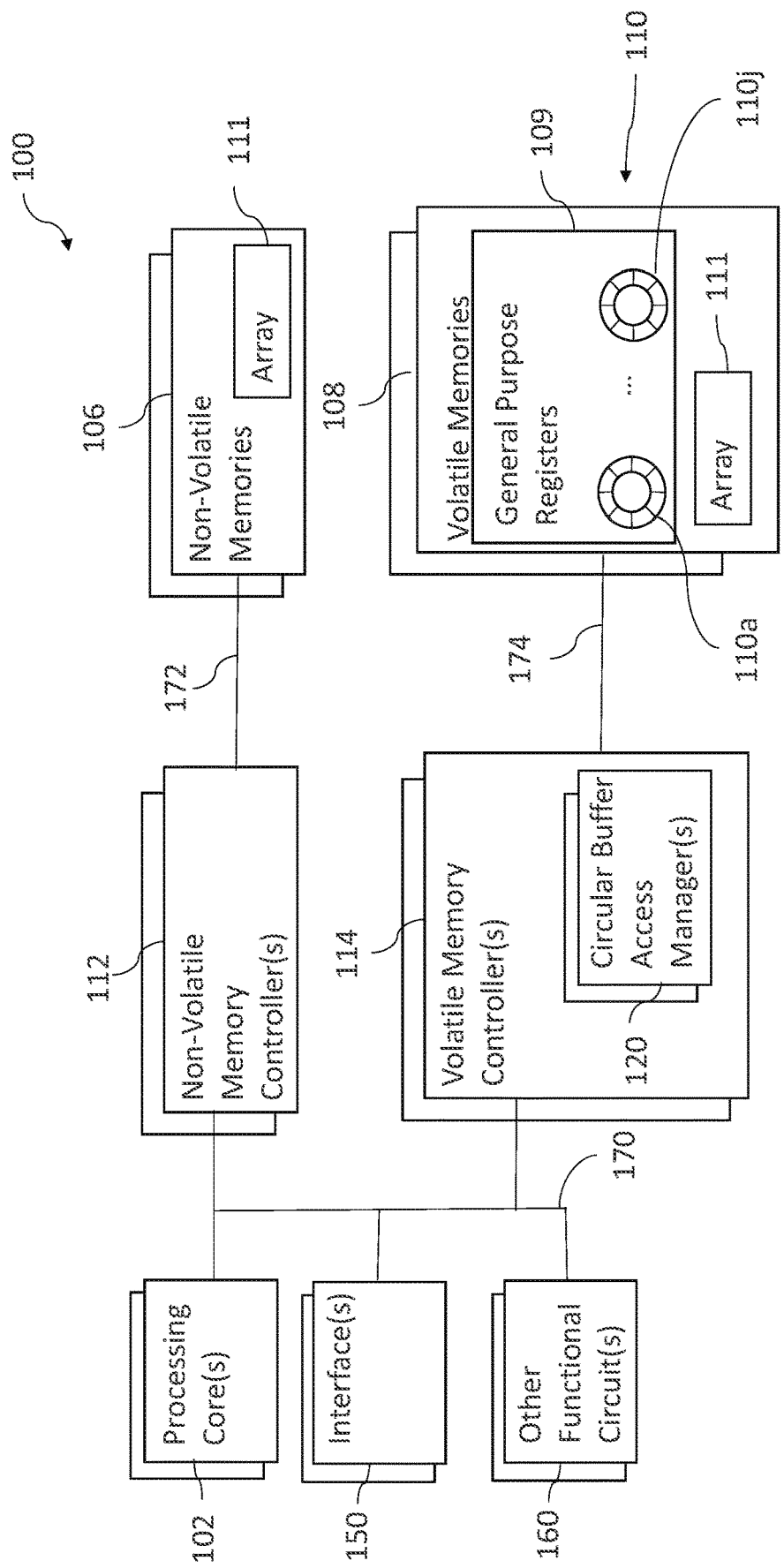
FIG. 1 is a functional block diagram of an embodiment of an electronic device or system having a memory and memory management circuitry according to an embodiment.

FIG. 1 is a functional block diagram of an embodiment of an electronic device or system 100 of the type to which the embodiments, which will be described, may apply. The system 100 comprises one or more processing cores or circuits 102. The processing cores 102 may comprise, for example, one or more processors, a state machine, a microprocessor, an MCU, a DSP, a programmable logic circuit, discrete circuitry, logic gates, registers, etc., and various combinations thereof. The processing cores 102 may control overall operation of the system 100, execution of application programs by the system 100, secure operations performed by the system 100, etc.

The system 100 includes one or more memories, such as one or more non-volatile memories 106 and one or more volatile memories 108, which may store, for example, all or part of instructions and data related to control of the system 100, applications and operations performed by the system 100, etc. One or more of the memories 106, 108 may include a memory array 111, all or part of which may, in operation, be employed by one or more processes executed by the system 100, such as one or more processes executed by a processor 102.

As illustrated, the volatile memories 108 include a plurality of general purpose registers 109 organized into one or more circular buffers 110, as illustrated circular buffers 110a to 110j. While the circular buffers are illustrated as being implemented using sets of general purpose registers, the circular buffers may be implemented using dedicated registers, regions of a memory array, individual memory arrays, etc., of the volatile memory 108. The circular buffers may, in operation, be employed by one or more processes executed by the system 100, such as one or more iterative processes executed by a processor 102.

As illustrated, the system 100 includes one or more non-volatile memory controllers 112 to control accesses to the non-volatile memories 106 by the processing cores 102 and one or more volatile memory controllers 114 to control access to the volatile memories 108 by the processing cores 102, such as accesses to the circular buffers 110.

The volatile memory controllers or circuits 114, as illustrated, include one or more circular buffer access managers or circuits 120, to manage accesses to the circular buffers 110, such as read and write operations to the circular buffers employed during processing operations by the processing cores 102. Such operations may include operations that are part of an iterative process, such as operations performed in the implementation of a LMS adaptive FIR filter. Managing accesses to data in circular buffers during the performance of operations associated with an iterative process may facilitate reductions in power consumption and improvements in performance as compared to conventional methods of performing such iterative processes. For example, manages accesses to data in circular buffers may facilitate parallel processing of an iterative sequence of operations and reuse of stored data during executing of the iterative sequence of operations.

The system 100 may include one or more interfaces 150 (e.g., wireless communication interfaces, wired communication interfaces, controller interfaces, etc.), and other functional circuits 160, which may include antennas, power supplies, sensors (e.g., image sensors, audio sensors, accelerometers, pressure sensors, temperature sensors, encoders, etc.), controllers (e.g., traction motor controllers, etc.) and a main bus system 170. The main bus system 170 may include one or more data, address, power and/or control buses coupled to the various components of the system 100. The system 100 also may include additional bus systems such as bus system 172, which communicatively couples the non-volatile memories 106 and the non-volatile memory controllers 112, and bus system 174, which communicatively couples the volatile memories 108 and the volatile memory controllers 114.

Embodiments of the system 100 of FIG. 1 may include more components than illustrated, may include fewer components than illustrated, may combine illustrated components or split illustrated components, and various combinations thereof. For example, instead of having a separate volatile memory 108 and volatile memory controller 114, the volatile memory 108 of system 100 may be modified to include a volatile memory controller 114, which may be split into volatile memory circular buffer control circuitry and control circuitry to control other modes of storing data in the volatile memory (e.g., streaming memory control circuitry). In another example, the non-volatile memory 106 may include memories organized into one or more circular buffers. In another example, the processing core 102 may have embedded registers which are organized into one or more circular buffers. The system 100 may comprise a system on a chip (SoC), discrete chips coupled together, etc., or various combinations thereof.

Figure 2:
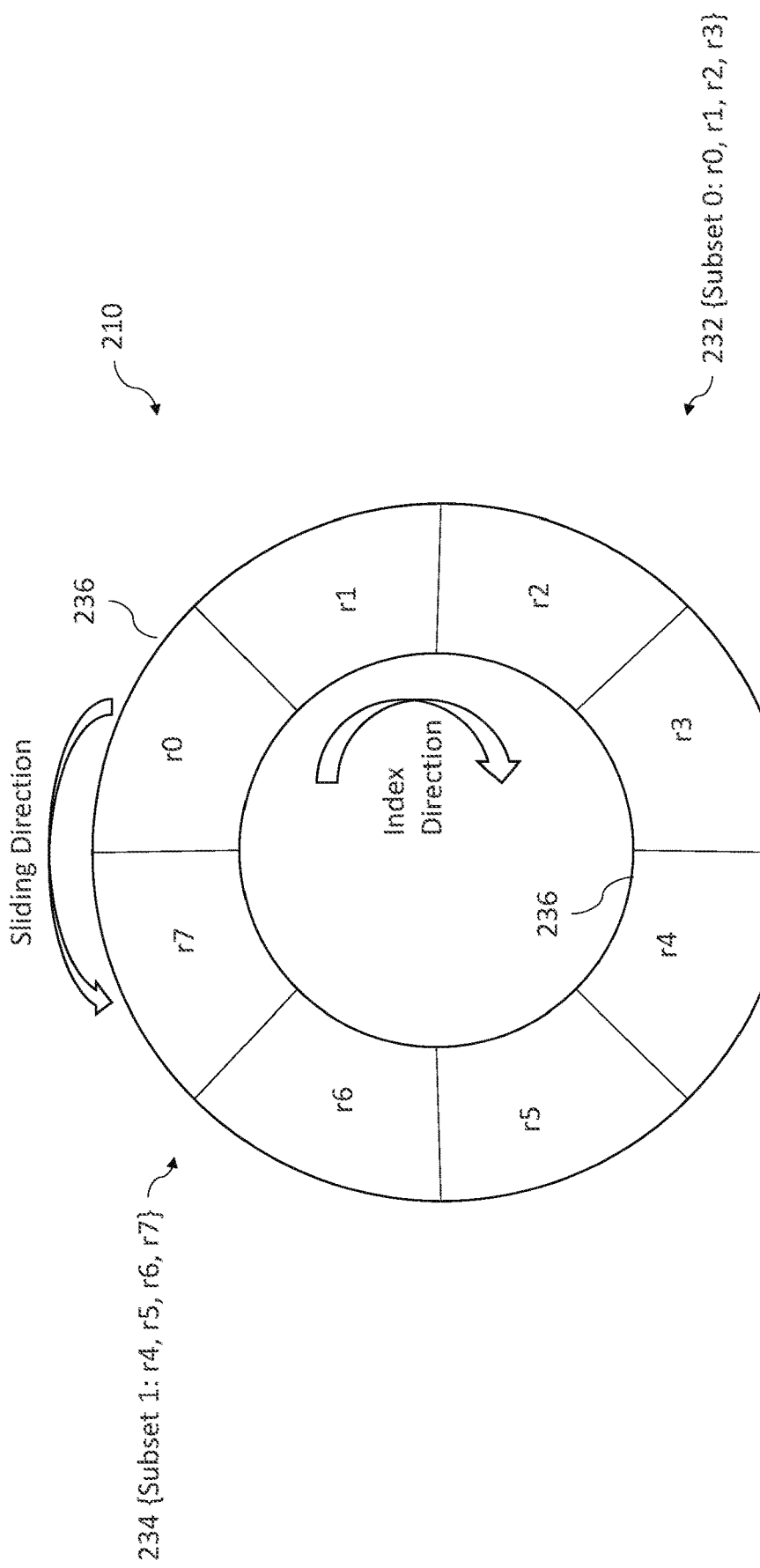
FIGS. 2 and 3 are conceptual diagrams illustrating example configurations of circular buffers according to various embodiments.

FIG. 2 is a conceptual diagram illustrating organization of a plurality of buffers into a circular buffer 210. An embedded processor, such as a RISC V processor, may have a plurality of general purpose registers (e.g., 32 registers), which may be accessed using an index from 0 to 31 linearly. The registers may each have a size of 32 bits. In an embodiment, the circular buffer 210 may be implemented using a plurality of the general purpose registers as buffers of the circular buffer 210. As illustrated, the circular buffer 210 comprises eight registers r0, r1, . . . , r7, organized as a first subset (subset 0) 232 of four buffers, as illustrated the four buffers are registers r0, r1, r2 and r3, and a second subset 234 (subset 1) of four buffers, as illustrated the four buffers are registers r4, r5, r6 and r7. If each of the buffers has a size of 32 bits and each piece of data is 32 bits, each of the subsets of buffers 232, 234 stores four 32 bit pieces of data.

The buffer subsets 232, 234 have starting buffers 236, as illustrated register r0 is the starting buffer or register 236 for the first subset of buffers 232, and register r4 is the starting buffer or register 236 for the second subset of buffers 234. A circular buffer addressing index has an address increment direction, as illustrated a clockwise increment direction. A data sliding direction, opposite of the address increment direction, as illustrated a counter-clockwise direction, may be utilized to slide data before loading the data into destination buffers of the circular buffer, as discussed in more detail below.

The conceptual diagram of FIG. 2 is just an example of the organization of a circular buffer that may be employed in various embodiments. For example, a circular buffer may include fewer or more than eight buffers (e.g., registers), and may include more than two subsets of buffers (registers). For example, a circular buffer may include 12 buffers organized into three subsets of four buffers.

Figure 3:
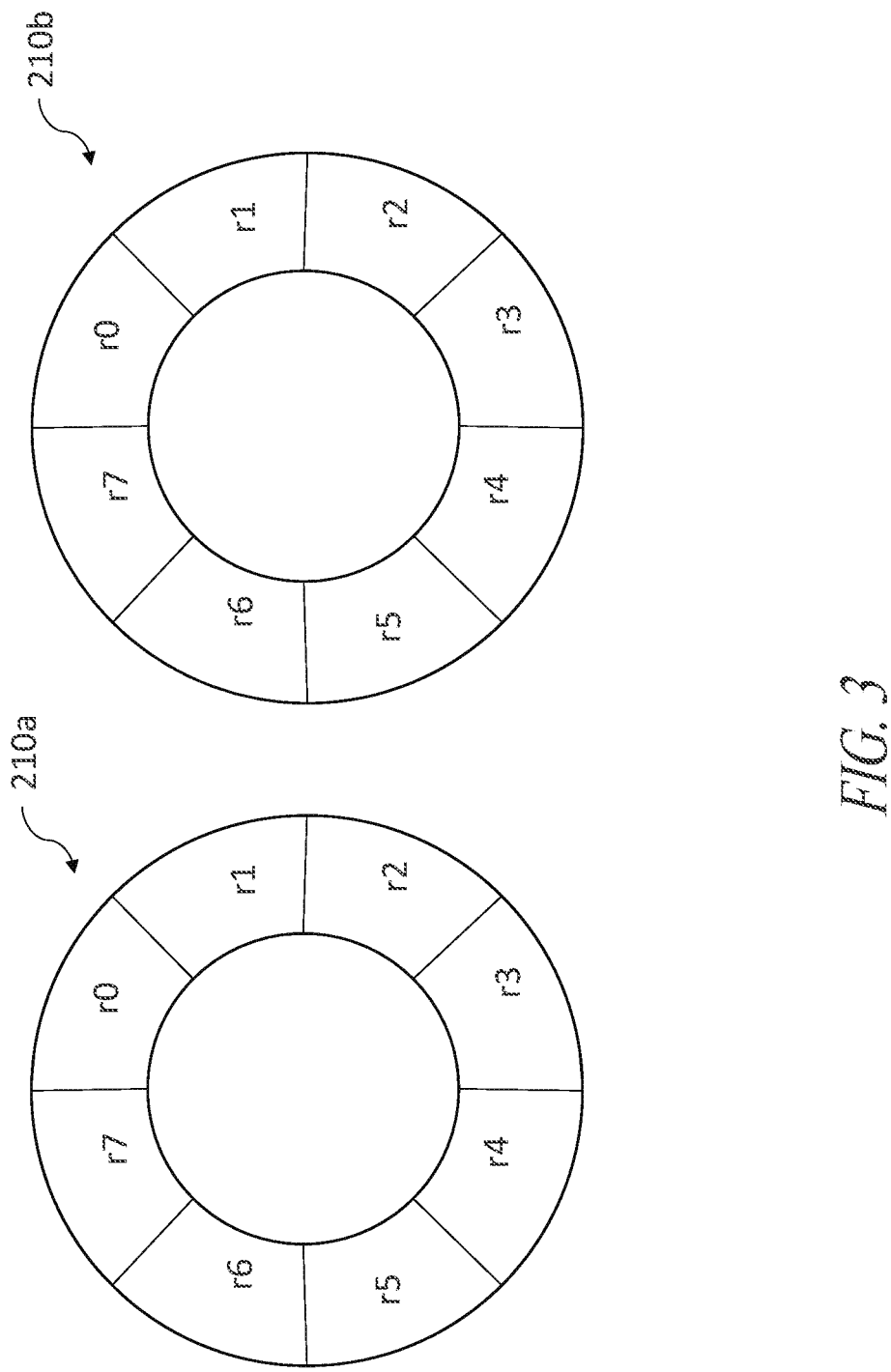

Multiple circular buffers may be employed in some embodiments, as illustrated in FIG. 1 (circular buffers 110a to 110i) and FIG. 3, which is a conceptual diagram illustrating organization of a plurality of buffers or registers into a plurality of circular buffers 210a, 210b. The circular buffers 210a, 210b may be organized in a manner similar to circular buffer 210 of FIG. 2, or may be organized in a different manner (e.g., including 12 buffers with 3 subsets).

A memory load instruction ldcs to load data into a circular buffer with circular sliding may take the following form:

ldcs % rd, [% rx], #idx where the parameter % rd is a buffer parameter that identifies a destination circular buffer (e.g., buffer 210 of FIG. 2) associated with the instruction ldcs, the parameter [% rx] is an offset parameter that identifies an address offset associated with the instruction ldcs, and the parameter #idx is a subset parameter that identifies a subset of buffers of the circular buffer (e.g., subset 0 or subset 1 of FIG. 2) associated with the instruction ldcs. The parameters % rd, [% rx], #idx, may be indexes, and may be are employed to determine buffers of a circular buffer in which to store data associated with the memory load instruction. In some embodiments, the parameter % rd may be omitted, for example, when the destination circular buffer is otherwise known (e.g., when only one circular buffer is employed). The size of the data to be loaded may correspond to the size of the subsets of buffers of the destination circular buffer. For example, when the memory load instruction is associated with 128 bits of data, such as four 32-bit words, the subsets of the circular buffer may comprise four 32-bit buffers or registers.

Figure 4:
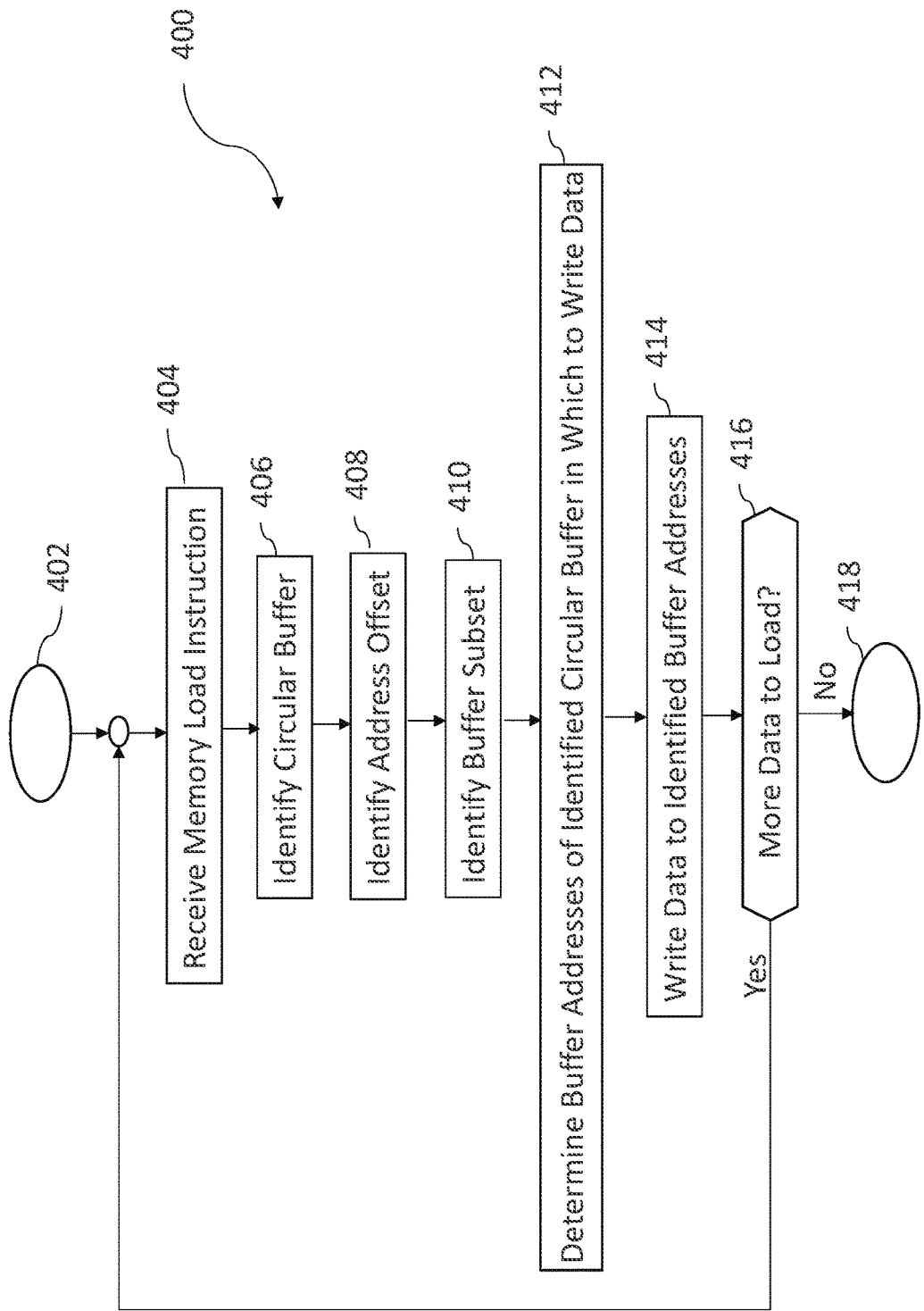
FIGS. 4 and 5 are flow diagrams illustrating example embodiments of methods of loading data into a circular buffer.
Figure 5:
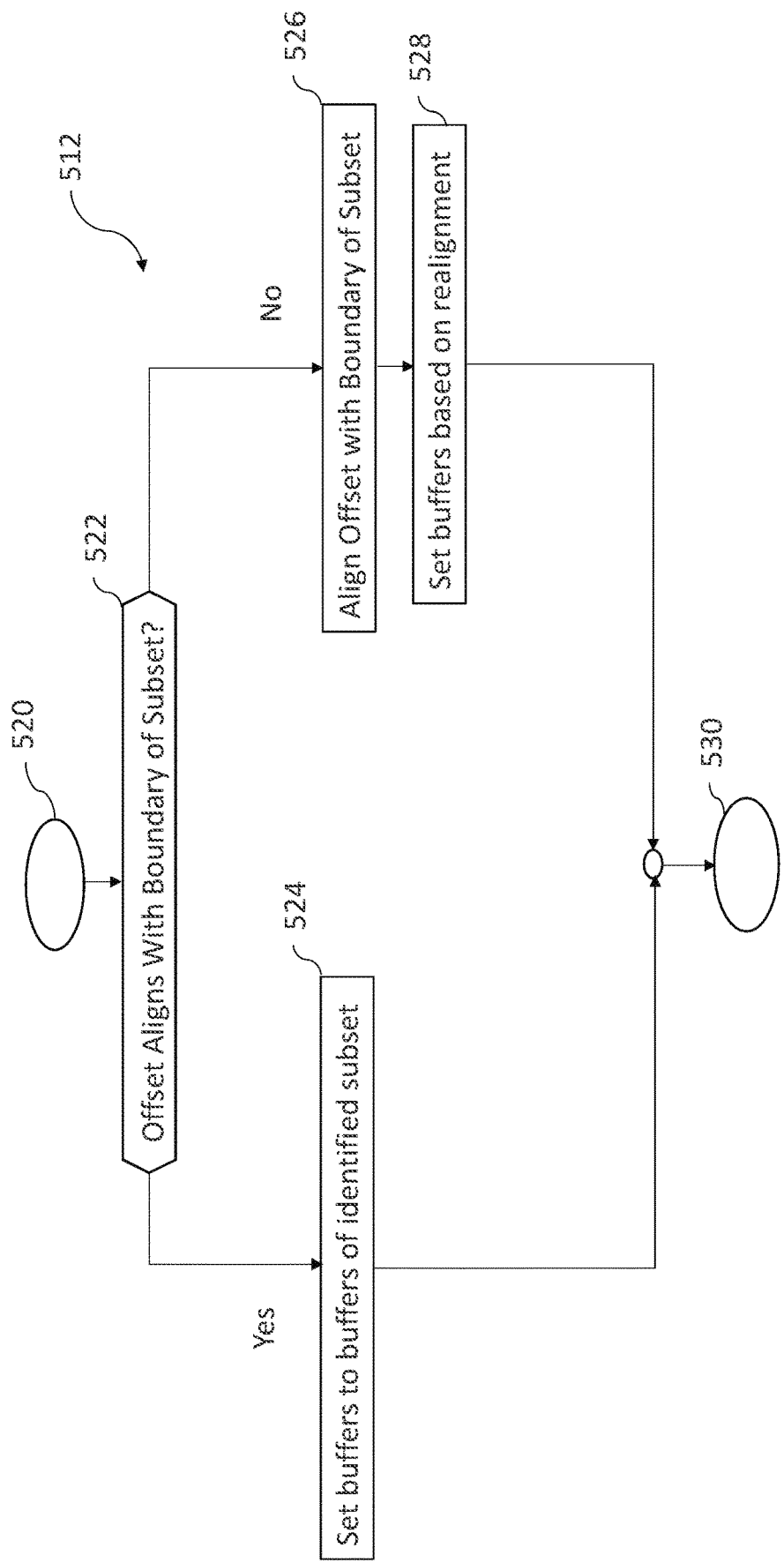

FIG. 4 illustrates an embodiment of a method 400 of loading data into a circular buffer that may be employed, for example, by the circular buffer access manager 120 of FIG. 1 to load data into a circular buffer, such as the circular buffer 110a of FIG. 1. FIG. 5 illustrates an embodiment of a method 512 of identifying buffers in a circular buffer in which to load data that may be employed, for example, by the method 400 of FIG. 4. FIG. 6 is a conceptual diagram illustrating an example memory mapping of a data set of 32-bit words and coefficients associated with an N tap adaptive LMS FIR filter. FIGS. 7 to 14 are conceptual diagrams illustrating examples of the storage of data in a circular buffer in response to a memory load instruction. For convenience, FIGS. 4 and 5 will be described with reference to FIGS. 1 to 3 and 6 to 14.

The method 400 starts at 402 and proceeds to 404. At 404, the method 400 receives a memory load command or instruction, such as instruction Idcs having a buffer parameter % rd, an offset parameter [% rx], and subset parameter #idx to load four 32-bit words of data into the circular buffer, or 128 total bits. For example, a memory load instruction may be an instruction to load data x[0], x[1], x[2] and x[3], to load data x[4], x[5], x[6] and [x[7], etc., of FIG. 6. In response to receiving the memory load instruction, the method 400 proceeds from 404 to 406.

At 406, the method 400 determines a circular buffer associated with the received memory load instruction. For example, the method 400 may use the parameter % rd to identify one of the circular buffers 110a to 110j of FIG. 1 as the circular buffer in which to load the data associated with the memory load instruction. The method 400 proceeds from 406 to 408.

At 408, the method 400 determines an address offset associated with the received memory load instruction. For example, the method 400 may use the parameter % rx to determine an address offset associated with the memory load instruction, such as an address offset 0x0, 0x4, 0x8, or 0xC of the data set mapping of FIG. 6. The method 400 proceeds from 408 to 410.

At 410, the method 400 determines a subset of buffers of the identified circular buffer associated with the received memory load instruction. The subset of buffers may have a same size as the data associated with the memory load instruction, such as a size of four 32-bit buffers. For example, the method 400 may use the parameter % Idx to identify subset 0 232 or subset 1 234 of FIG. 2 as the subset of buffers associated with the memory load instruction, such as the subset addresses 0x10, 0x20, 0x30 . . . of the data set mapping of FIG. 6. For example, subset address 0x10 may correspond to buffer subset 1 234, subset address 0x20 may correspond to buffer subset 0 232, subset address 0x30 may correspond to buffer subset 1 234, etc. The method 400 proceeds from 410 to 412.

At 412, the method 400 identifies buffers of the identified circular buffer in which to write the data associated with the received memory load instruction based on the address offset determined at 408 and the subset of buffers identified at 410. This may be done, for example, using the method 512 of FIG. 5. The method 400 proceeds from 412 to 414.

At 414, the method 400 writes the data associated with the memory load instruction into the identified buffers of the identified circular buffer determined at 412. The method 400 proceeds from 414 to 416.

At 416, the method 400 determines whether there is more data to load. When the method 400 determines that there is more data to load, the method 400 returns to 404 to wait for another memory load instruction. When the method 400 does not determine that there is more data to load, the method 400 proceeds to 418, where the method 400 may terminate or may perform other processing, such as processing associated with the data stored in the identified circular buffer.

Embodiments of the method 400 of FIG. 4 may not include all of the illustrated acts, may include additional acts, may combine acts, may split acts, and may perform acts in various orders. For example, acts 406, 408, 410 may be performed in various orders, performed in parallel, or combined, act 406 may be omitted, for example, when only a single circular buffer is employed, etc.

FIG. 5 illustrates an embodiment of a method 512 of determining the buffers of an identified circular buffer in which to write data associated with a memory load instruction that may be employed, for example, by act 412 of the method 400 of FIG. 4.

The method 512 starts at 520 and proceeds to 522. At 522, the method 512 determines whether the address offset associated with a received memory load instruction aligns with a boundary buffer of a subset of buffers of a circular buffer associated with the memory load instruction. With reference to FIG. 6, the method 512 may determine at 522 that the address offset associated with the received memory load instruction aligns with the boundary of the subset of buffers when the address offset is 0x0, and may determine the address offset does not align with the boundary of the subset of buffers of the circular buffer when the address offset is 0x4, 0x8 or 0xC.

When it is determined at 522 that the address offset aligns with the boundary of the subset of buffers of the circular buffer, the method 512 proceeds to 524, where the method sets the buffers of the identified subset of buffers as the buffers in which to load the data associated with the memory load instruction. The method 512 proceeds from 524 to 530, where the method provides the buffer addresses of the identified circular buffer to the method 400 for use in loading the data associated with the memory load instruction at 414.

Figure 7:
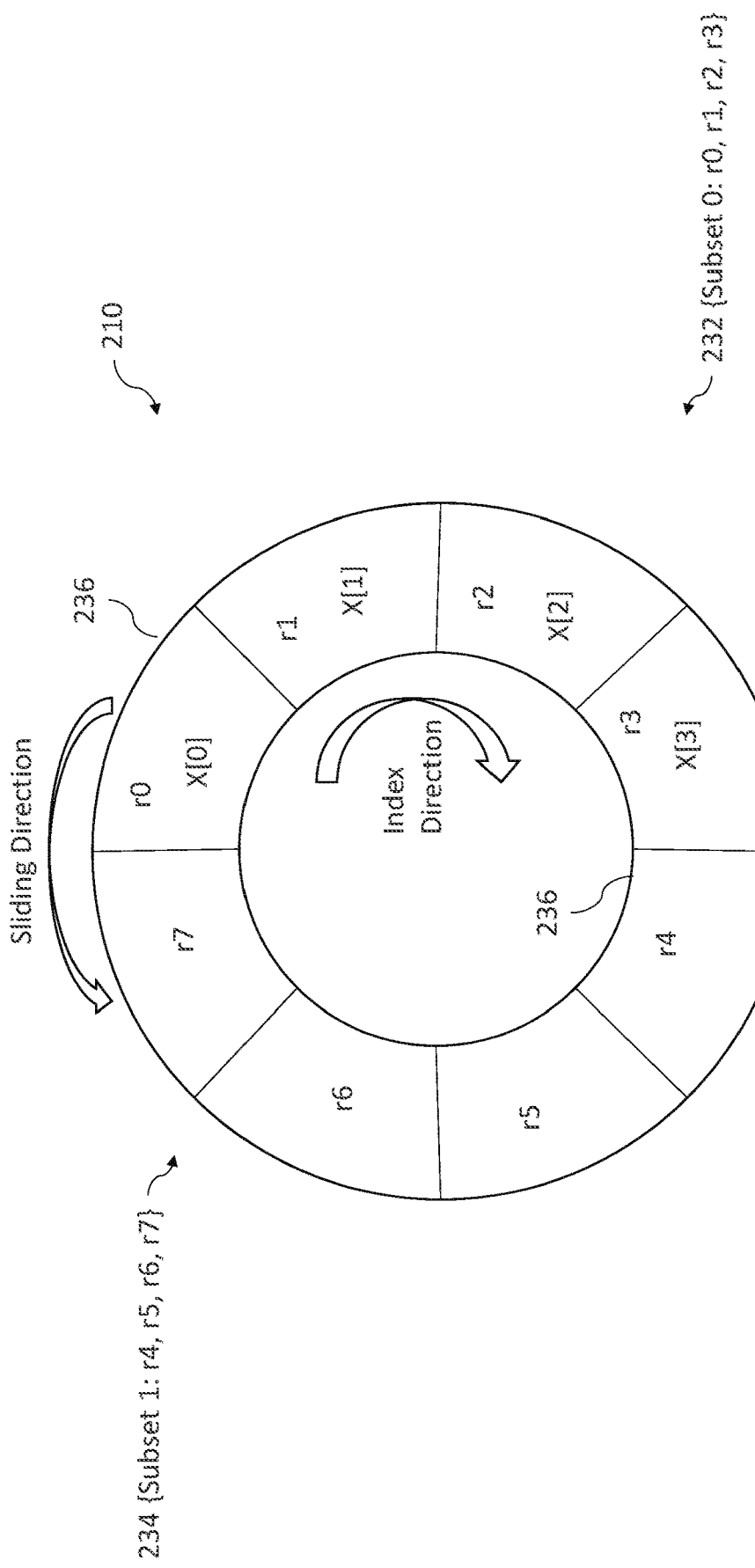
FIGS. 7 to 14 are conceptual diagrams illustrating examples of data loaded into a circular buffer according to various embodiments.

FIG. 7 is a conceptual diagram illustrating an example of the storage of data in response to a memory load instruction Idcs to load the following data into a circular buffer: x[0], which has an address of 0x0 in FIG. 6; x[1], which has an address of 0x4 in FIG. 6; x[2], which has an address of 0x8 in FIG. 6; and x[3], which has an address of 0xC in FIG. 6. The buffer parameter % rd identifies buffer 210 as the destination circular buffer, the offset parameter % rx identifies the address offset as 0x0, and the subset parameter #idx identifies the subset of buffers subset 0 232 of the circular buffer as the subset of buffers associated with the memory load instruction Idcs. The address offset of 0x0 indicates the data having the address of 0x0 (x[0] in FIG. 6) is to be stored in the boundary buffer 236 of subset 0 232 (which is the buffer corresponding to r0 in FIG. 7). Thus, the offset aligns with the boundary buffer 236 and the data is loaded into the buffers of the identified subset of buffer subset 0 232, with x[0] loaded into buffer r0, x[1] loaded into buffer r1, x[2] loaded into buffer r2, and x[3] loaded into buffer r3.

Figure 8:
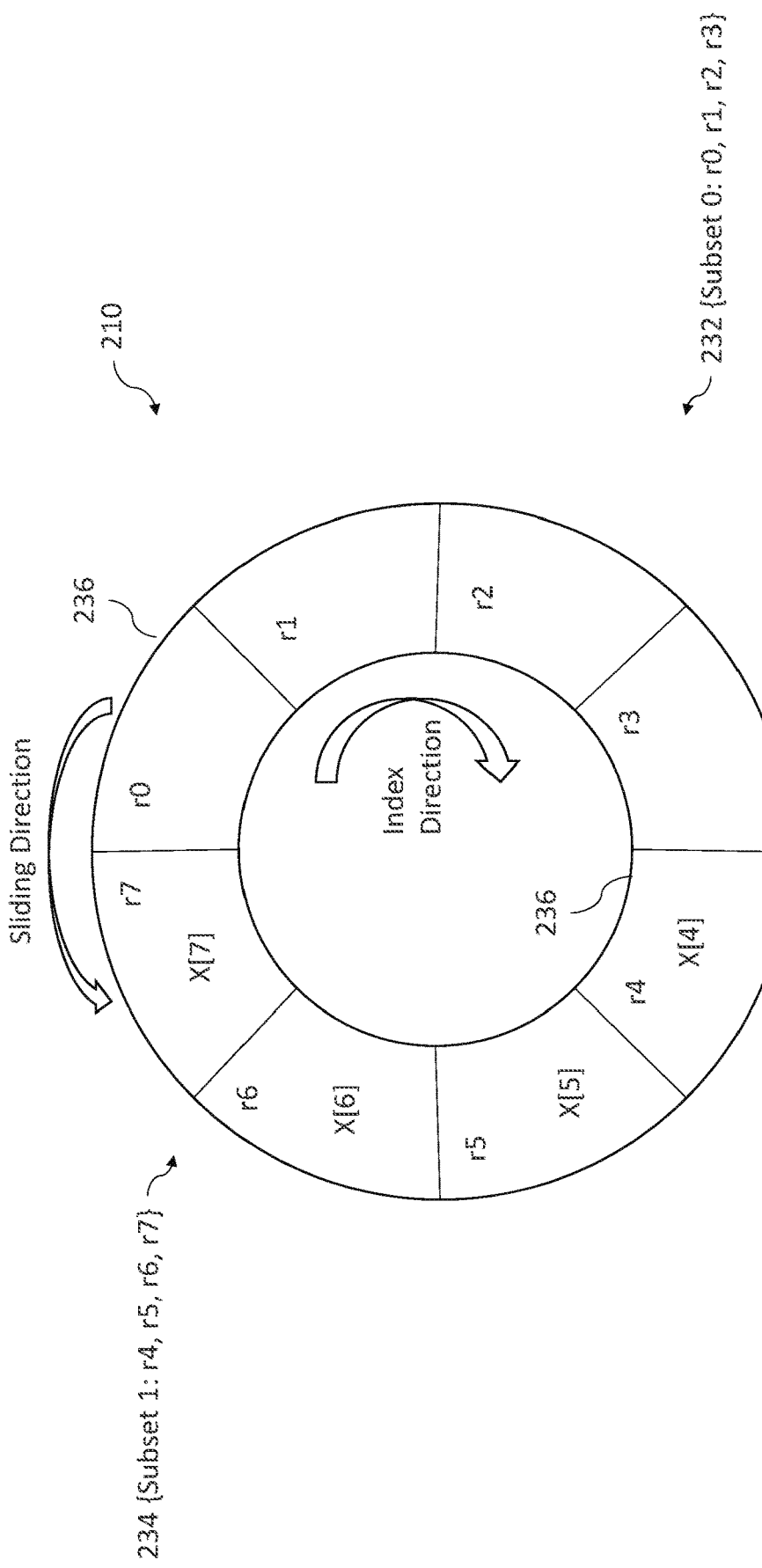

FIG. 8 is a conceptual diagram illustrating an example of the storage of data in response to a memory load instruction Idcs to load the following data into a circular buffer: x[4], which has an address of 0x0 in FIG. 6; x[5], which has an address of 0x4 in FIG. 6; x[6], which has an address of 0x8 in FIG. 6; and x[7], which has an address of 0xC in FIG. 6.

The buffer parameter % rd identifies buffer 210 as the destination circular buffer, the offset parameter % rx identifies the address offset as 0x0, and the subset parameter #idx identifies the subset of buffers subset 1 234 of the circular buffer as the subset of buffers associated with the memory load instruction Idcs. The address offset of 0x0 indicates the data having the address of 0x0 (x[4] in FIG. 6) is to be stored in the boundary buffer 236 of subset 1 234 (which is the buffer corresponding to r4 in FIG. 8). Thus, the offset aligns with the boundary buffer 236 and the data is loaded into the buffers of the identified subset of buffer subset 1 234, with x[4] loaded into buffer r4, x[5] loaded into buffer r5, x[6] loaded into buffer r6, and x[7] loaded into buffer r7.

When it is not determined at 522 that the address offset aligns with the boundary of the subset of buffers of the circular buffer, the method 512 proceeds to 526 where the data associated with the address of the address offset is aligned with the boundary buffer of the identified subset of buffers of the circular buffer. For example, the data may be shifted in a sliding direction opposite of an index direction of the circular buffer until the data associated with the address of the address offset is aligned with the boundary buffer, e.g., shifted by one buffer address. The method proceeds from 526 to 528, where the method sets the buffers in which to load the data associated with the memory load instruction based on the alignment of the data associated with the address offset with the boundary buffer. The method 512 proceeds from 528 to 530, where the method provides the buffer addresses determined based on the realignment of the data to the method 400 for use in loading the data associated with the memory load instruction at 414.

Figure 9:
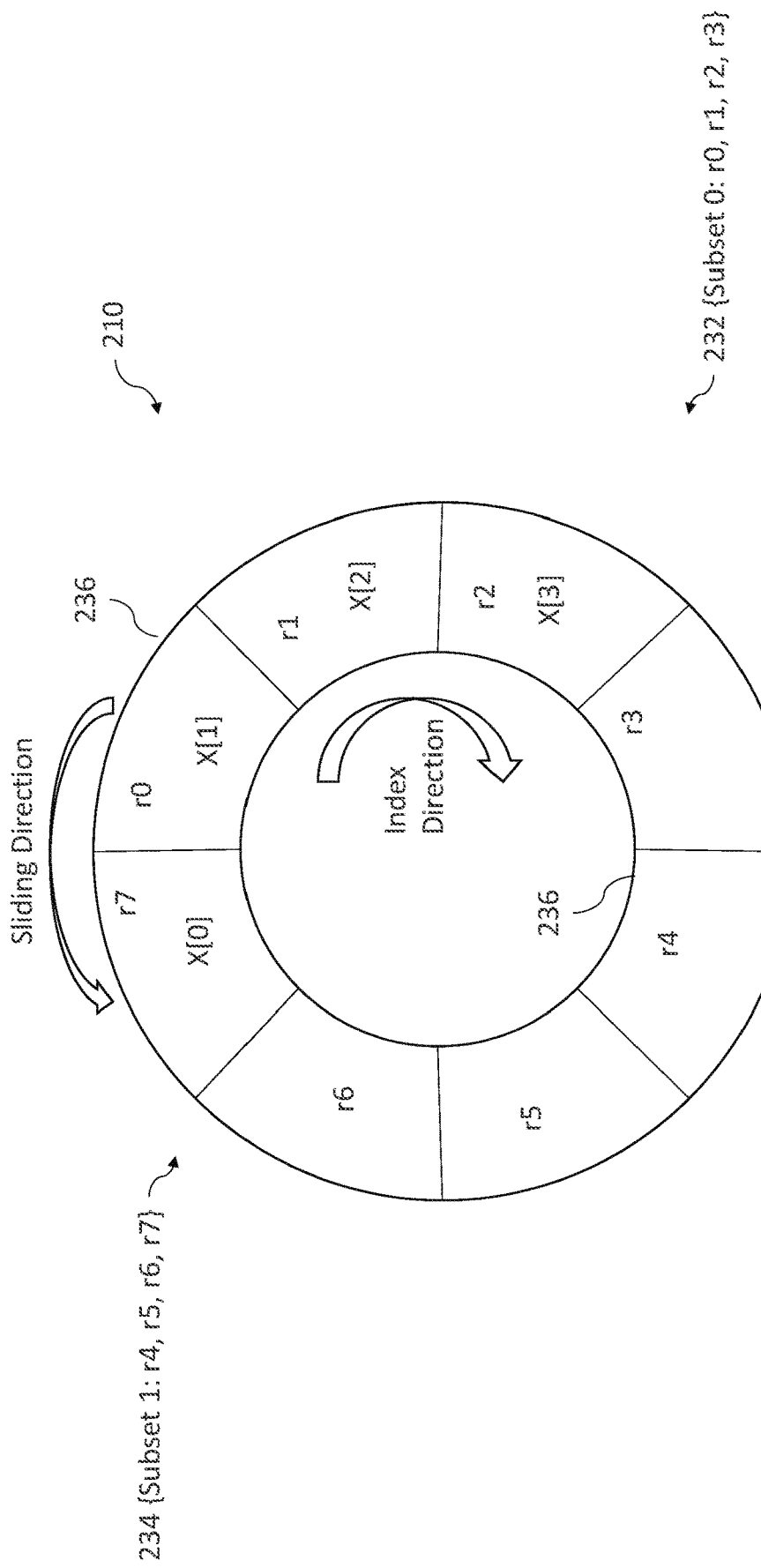

FIG. 9 is a conceptual diagram illustrating an example of the storage of data in response to a memory load instruction Idcs to load the following data into a circular buffer: x[0], which has an address of 0x0 in FIG. 6; x[1], which has an address of 0x4 in FIG. 6; x[2], which has an address of 0x8 in FIG. 6; and x[3], which has an address of 0xC in FIG. 6. The buffer parameter % rd identifies buffer 210 as the destination circular buffer, the offset parameter % rx identifies the address offset as 0x4, and the subset parameter #idx identifies the subset of buffers subset 0 232 of the circular buffer as the subset of buffers associated with the memory load instruction Idcs. The address offset of 0x4 indicates the data having the address of 0x4 (x[1] in FIG. 6) is to be stored in the boundary buffer 236 of subset 0 232 (which is the buffer corresponding to r0 in FIG. 9). Thus, the offset does not align with the boundary buffer 236 and the data is shifted by one register to align the offset with the boundary buffer 236 before the data is loaded into the buffers of the identified subset of buffer subset 0 232. Due to the shifting, data x[1] is loaded into buffer r0 instead of buffer r1, data x[2] is loaded into buffer r1 instead of buffer r2, data x[3] is loaded into buffer r2 instead of buffer r3, and data x[0] is loaded into buffer r7 instead of buffer r3.

Figure 10:
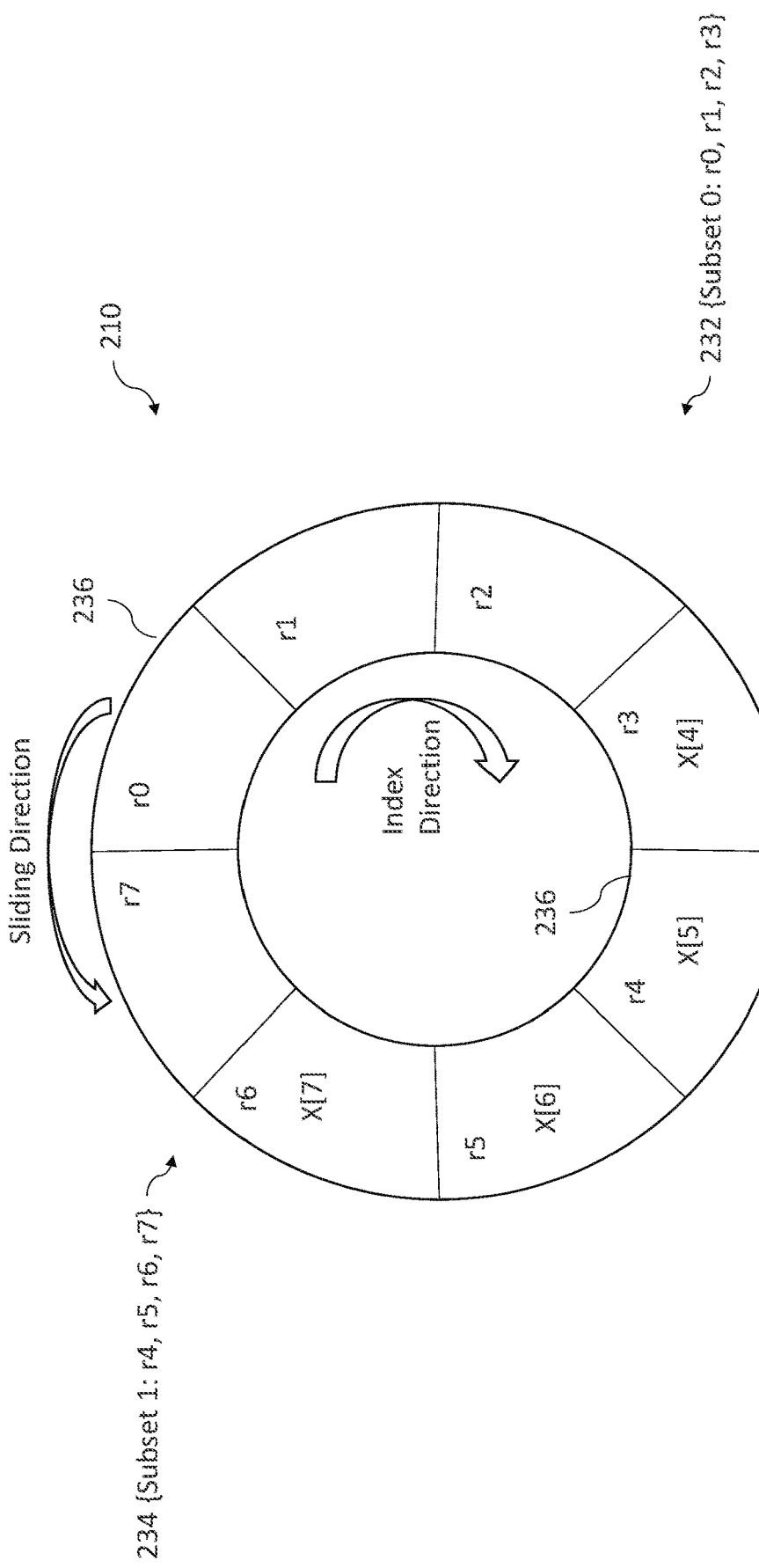

FIG. 10 is a conceptual diagram illustrating an example of the storage of data in response to a memory load instruction Idcs to load the following data into a circular buffer: x[4], which has an address of 0x0 in FIG. 6; x[5], which has an address of 0x4 in FIG. 6; x[6], which has an address of 0x8 in FIG. 6; and x[7], which has an address of 0xC in FIG. 6. The buffer parameter % rd identifies buffer 210 as the destination circular buffer, the offset parameter % rx identifies the address offset as 0x4, and the subset parameter #idx identifies the subset of buffers subset 1 234 of the circular buffer as the subset of buffers associated with the memory load instruction Idcs. The address offset of 0x4 indicates the data having the address of 0x4 (x[5] in FIG. 6) is to be stored in the boundary buffer 236 of subset 1 234 (which is the buffer corresponding to r4 in FIG. 10). Thus, the offset does not align with the boundary buffer 236 and the data is shifted by one register to align the offset with the boundary buffer 236 before the data is loaded into the buffers of the identified subset of buffer subset 1 234. Due to the shifting, data x[5] is loaded into buffer r4 instead of buffer r5, data x[6] is loaded into buffer r5 instead of buffer r6, data x[7] is loaded into buffer r6 instead of buffer r7, and data x[4] is loaded into buffer r3 instead of buffer r4.

Figure 11:
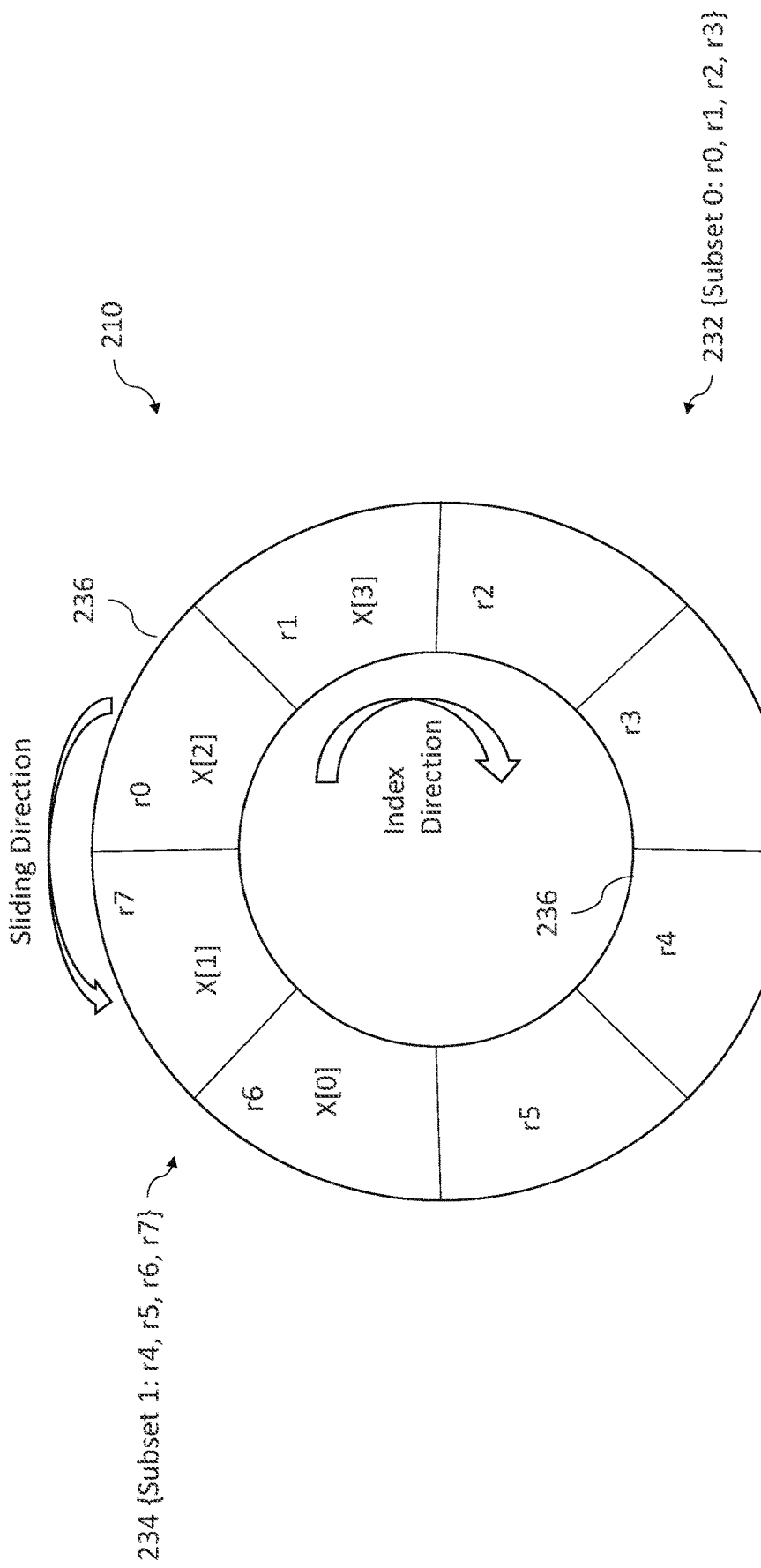

FIG. 11 is a conceptual diagram illustrating an example of the storage of data in response to a memory load instruction Idcs to load the following data into a circular buffer: x[0], which has an address of 0x0 in FIG. 6; x[1], which has an address of 0x4 in FIG. 6; x[2], which has an address of 0x8 in FIG. 6; and x[3], which has an address of 0xC in FIG. 6. The buffer parameter % rd identifies buffer 210 as the destination circular buffer, the offset parameter % rx identifies the address offset as 0x8, and the subset parameter #idx identifies the subset of buffers subset 0 232 of the circular buffer as the subset of buffers associated with the memory load instruction Idcs. The address offset of 0x8 indicates the data having the address of 0x8 (x[2] in FIG. 6) is to be stored in the boundary buffer 236 of subset 0 232 (which is the buffer corresponding to r0 in FIG. 11). Thus, the offset does not align with the boundary buffer 236 and the data is shifted by two registers to align the offset with the boundary buffer 236 before the data is loaded into the buffers of the identified subset of buffer subset 0 232. Due to the shifting, data x[2] is loaded into buffer r0 instead of buffer r2, data x[3] is loaded into buffer r1 instead of buffer r3, data x[1] is loaded into buffer r7 instead of buffer r1, and data x[0] is loaded into buffer r6 instead of buffer r0.

Figure 12:
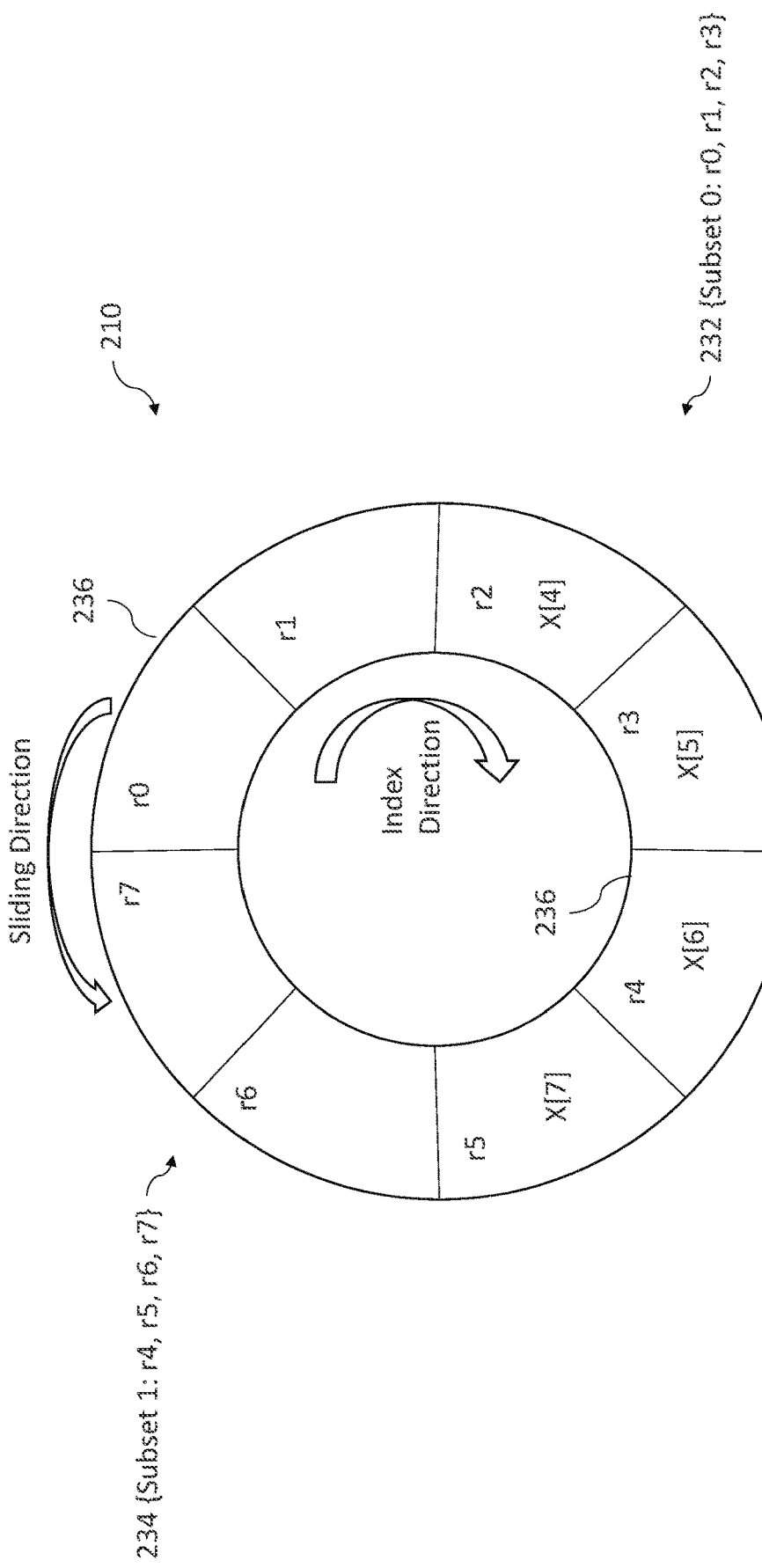

FIG. 12 is a conceptual diagram illustrating an example of the storage of data in response to a memory load instruction Idcs to load the following data into a circular buffer: x[4], which has an address of 0x0 in FIG. 6; x[5], which has an address of 0x4 in FIG. 6; x[6], which has an address of 0x8 in FIG. 6; and x[7], which has an address of 0xC in FIG. 6. The buffer parameter % rd identifies buffer 210 as the destination circular buffer, the offset parameter % rx identifies the address offset as 0x8, and the subset parameter #idx identifies the subset of buffers subset 1 234 of the circular buffer as the subset of buffers associated with the memory load instruction Idcs. The address offset of 0x8 indicates the data having the address of 0x8 (x[6] in FIG. 6) is to be stored in the boundary buffer 236 of subset 1 234 (which is the buffer corresponding to r4 in FIG. 12). Thus, the offset does not align with the boundary buffer 236 and the data is shifted by two registers to align the offset with the boundary buffer 236 before the data is loaded into the buffers of the identified subset of buffer subset 1 234. Due to the shifting, data x[6] is loaded into buffer r4 instead of buffer r6, data x[7] is loaded into buffer r5 instead of buffer r7, data x[5] is loaded into buffer r3 instead of buffer r5, and data x[4] is loaded into buffer r2 instead of buffer r4.

Figure 13:
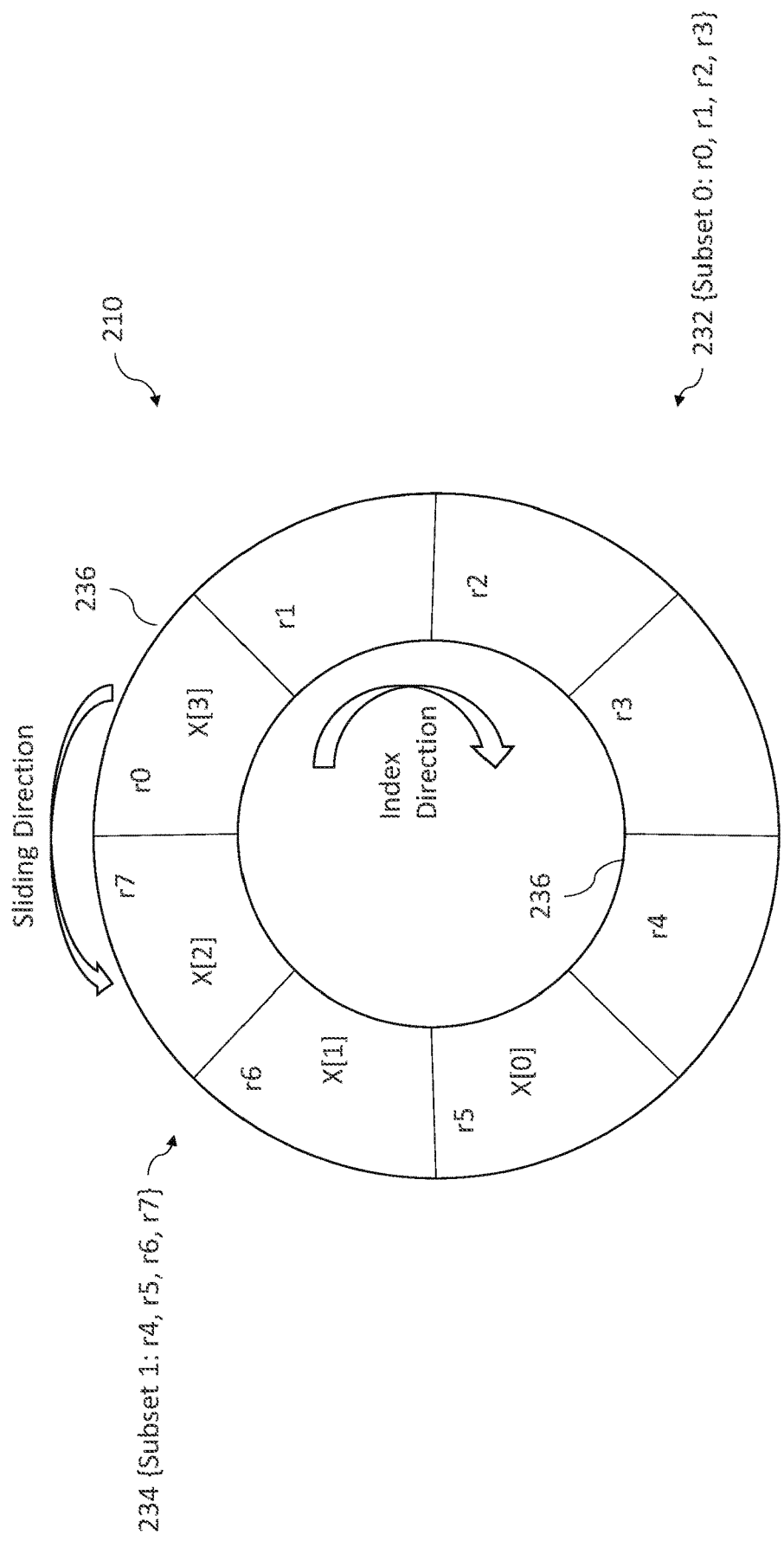

FIG. 13 is a conceptual diagram illustrating an example of the storage of data in response to a memory load instruction Idcs to load the following data into a circular buffer: x[0], which has an address of 0x0 in FIG. 6; x[1], which has an address of 0x4 in FIG. 6; x[2], which has an address of 0x8 in FIG. 6; and x[3], which has an address of 0xC in FIG. 6. The buffer parameter % rd identifies buffer 210 as the destination circular buffer, the offset parameter % rx identifies the address offset as 0xC, and the subset parameter #idx identifies the subset of buffers subset 0 232 of the circular buffer as the subset of buffers associated with the memory load instruction Idcs. The address offset of 0xC indicates the data having the address of 0xC (x[3] in FIG. 6) is to be stored in the boundary buffer 236 of subset 0 232 (which is the buffer corresponding to r0 in FIG. 13). Thus, the offset does not align with the boundary buffer 236 and the data is shifted by three registers to align the offset with the boundary buffer 236 before the data is loaded into the buffers of the identified subset of buffer subset 0 232. Due to the shifting, data x[3] is loaded into buffer r0 instead of buffer r3, data x[2] is loaded into buffer r7 instead of buffer r2, data x[1] is loaded into buffer r6 instead of buffer r1, and data x[0] is loaded into buffer r5 instead of buffer r0.

Figure 14:
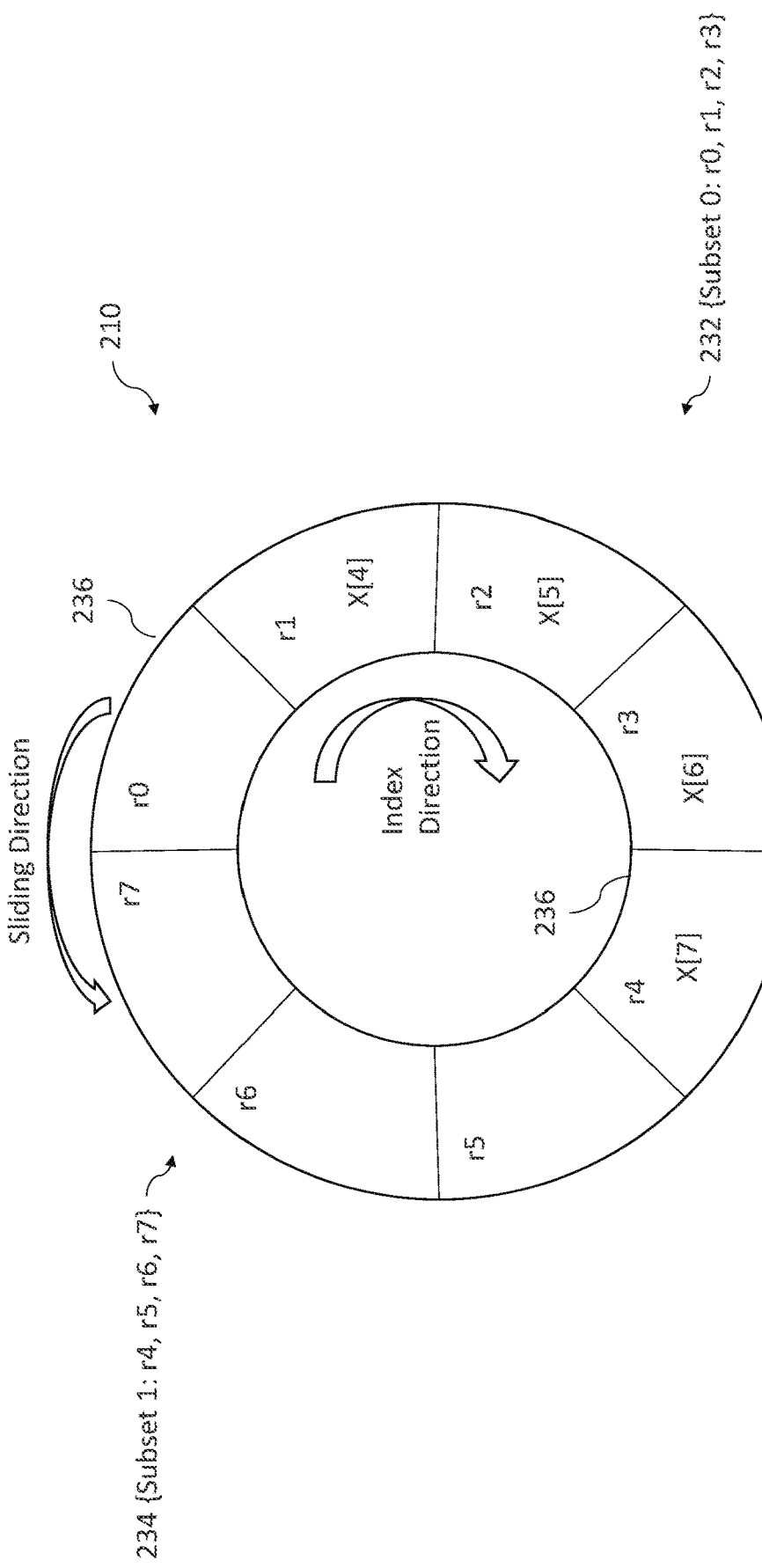

FIG. 14 is a conceptual diagram illustrating an example of the storage of data in response to a memory load instruction Idcs to load the following data into a circular buffer: x[4], which has an address of 0x0 in FIG. 6; x[5], which has an address of 0x4 in FIG. 6; x[6], which has an address of 0x8 in FIG. 6; and x[7], which has an address of 0xC in FIG. 6. The buffer parameter % rd identifies buffer 210 as the destination circular buffer, the offset parameter % rx identifies the address offset as 0xC, and the subset parameter #idx identifies the subset of buffers subset 1 234 of the circular buffer as the subset of buffers associated with the memory load instruction Idcs. The address offset of 0xC indicates the data having the address of 0xC (x[7] in FIG. 6) is to be stored in the boundary buffer 236 of subset 1 234 (which is the buffer corresponding to r4 in FIG. 14). Thus, the offset does not align with the boundary buffer 236 and the data is shifted by three registers to align the offset with the boundary buffer 236 before the data is loaded into the buffers of the identified subset of buffer subset 1 234. Due to the shifting, data x[7] is loaded into buffer r4 instead of buffer r7, data x[6] is loaded into buffer r3 instead of buffer r6, data x[5] is loaded into buffer r2 instead of buffer r5, and data x[4] is loaded into buffer r1 instead of buffer r4.

Additional data of the data set of FIG. 6 (e.g., x[8] to x[11], ... x[N−4] to x[N−1]) may be loaded into the circular buffer using memory load instructions, such as Idcs, replacing previous data (e.g., incrementing the subset parameter). Other data and variables may be loaded into additional circular buffers, such as coefficients b[7] to b[0] of FIG. 6. In some embodiments, multiple circular buffers may be employed to store the input data x[0] to x[N−1], instead of overwriting the data.

Conventionally, an N tap LMS adaptive filter is an iterative process comprising, in each iteration, the following three steps in order:

(1) perform a FIR calculation, for example, according to:

$$y[n] = \sum_{k=0}^{N-1}(b_n(k)*x(n-k));$$

Figure 15:
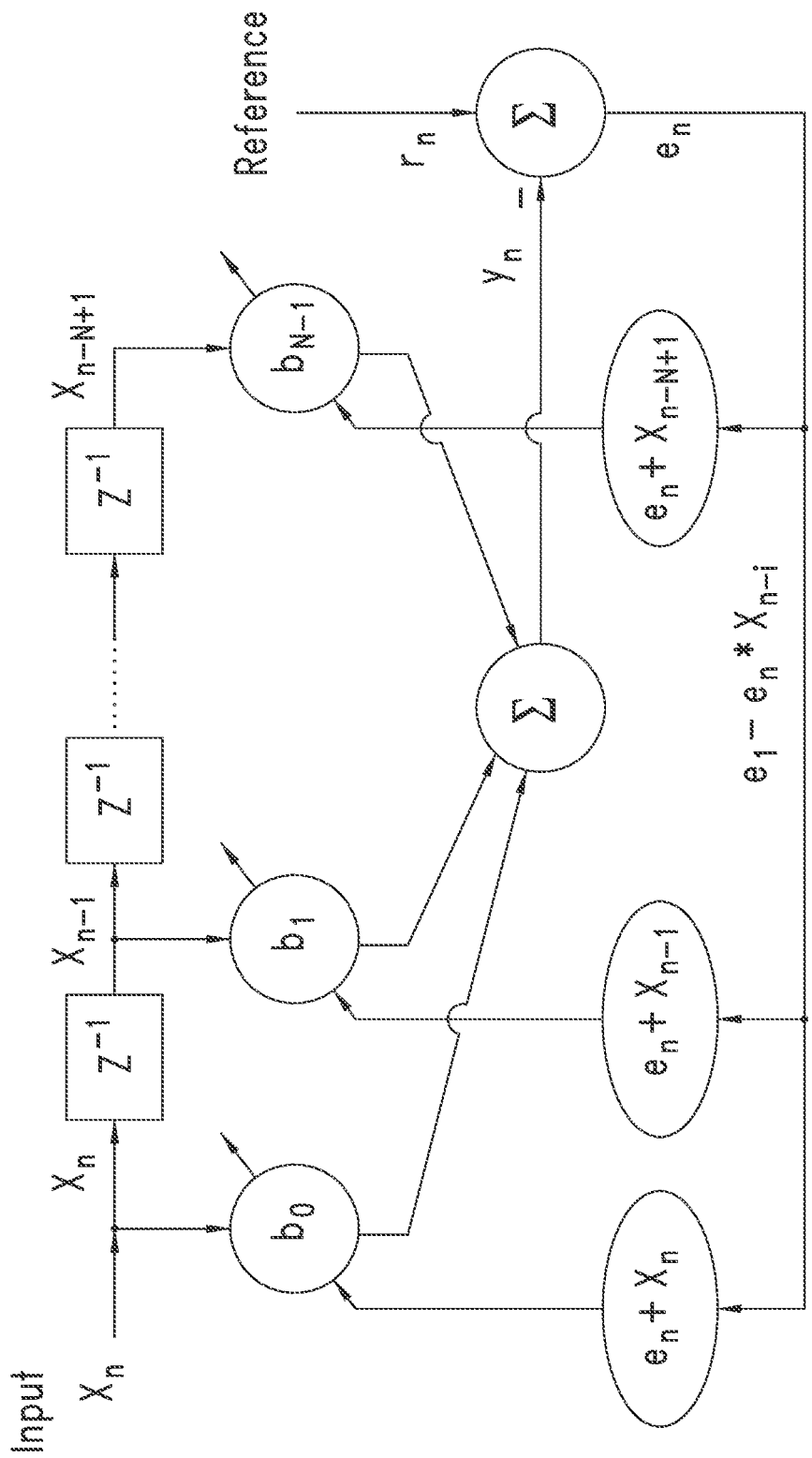
FIG. 15 is a conceptual diagram of a conventional implementation of an N tap LMS adaptive FIR filter.

(2) perform an error calculation according to:

$e_n = r[n] - y[n]$; and (3) update the FIR coefficients according to:

$b_{n+1}(k) = b_n(k) + e_n*x(n-k), k=0,1,\ldots,N-1$, where x is an input signal value, b is a coefficient of the FIR filter, and r is the desired output signal (e.g., a reference signal). FIG. 15 is a conceptual diagram illustration a conventional implementation of a FIR filter. The (n−1)th iteration of the LMS comprises calculating y[n−1] and updating the coefficients $b_n$ as follows:

$y[n-1]=(x[n-1]*b_{n-1}[0]+x[n-2]*b_{n-1}[1]+x[n-3]*b_{n-1}[2]+x[n-4]*b_{n-1}[3]+x[n-5]*b_{n-1}[4]+x[n-6]*b_{n-1}[5]+x[n-7]*b_{n-1}[6]+x[n-8]*b_{n-1}[7])$ $e_{n-1}=r[n-1]-y[n-1]$ $b_n(k)=b_{n-1}(k)+e_{n-1}*x(n-1-k)$ ///k=0,1, . . . ,7

The (n)th iteration of the LMS comprises calculating y[n] and updating the coefficients $b_{n+1}$ as follows:

$y[n]=(x[n]*bn[0]+x[n-1]*bn[1]+x[n-2]*bn[2]+x[n-3]*bn[3]+x[n-4]*bn[4]+x[n-5]*bn[5]+x[n-6]*bn[6]+x[n-7]*bn[7])$ $en=r[n]-y[n]$ $bn+1(k)=bn(k)+en*x(n-k)$ ///k=0,1, . . . ,7

As can be seen, each of the steps of each iteration is dependent on the prior step—the error calculation is dependent on the FIR calculation, and the coefficient updating is dependent on the error calculation. These dependencies may cause performance issues because the steps are performed in sequence, rather than in parallel, and while some of the same input signals are used, the values are not shared between steps, which can result in high power consumption.

Figure 16:
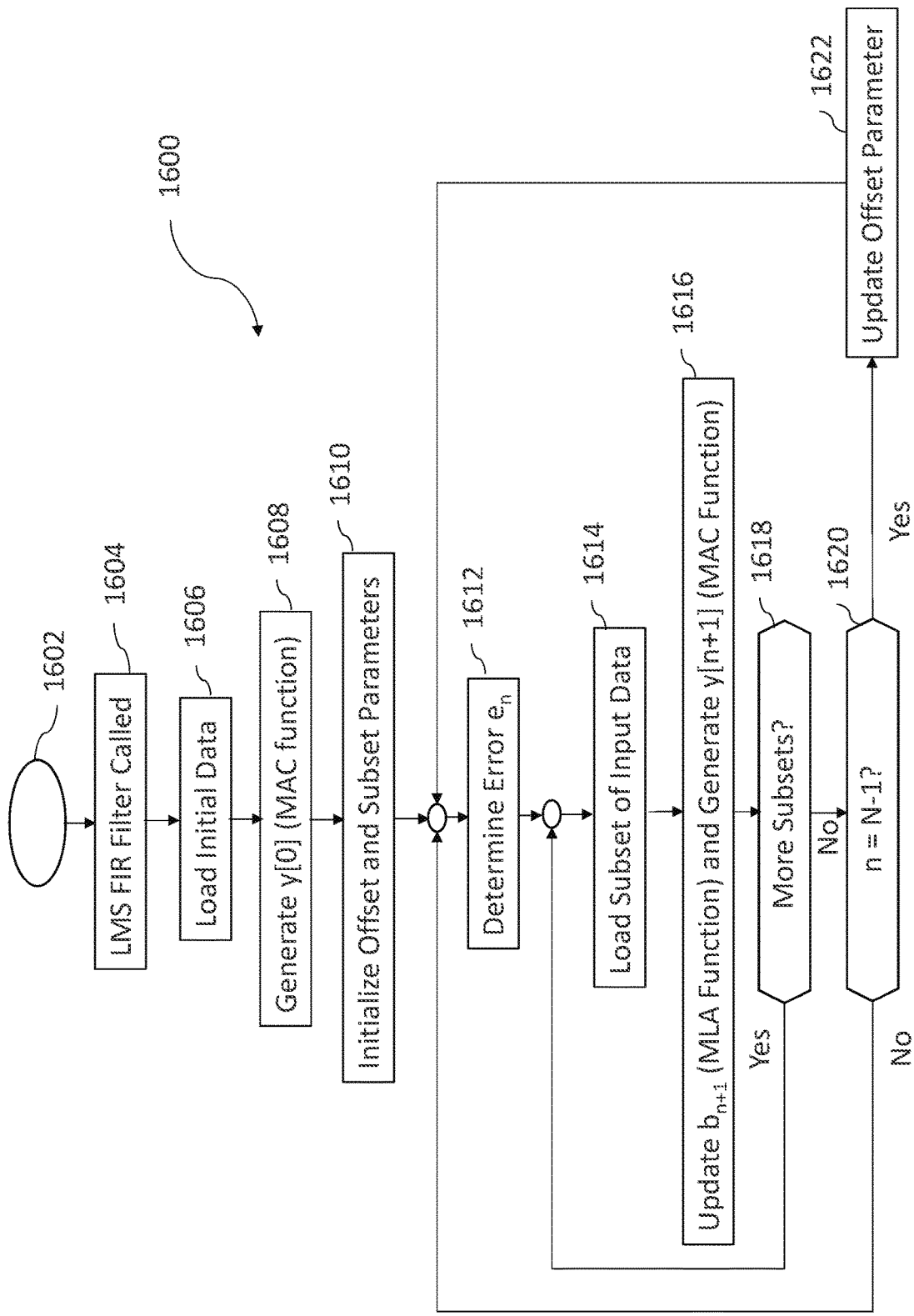
FIG. 16 is a flow diagram illustrating an example embodiment of implementing an N tap LMS adaptive FIR filter using memory load instructions employing circular sliding.

As mentioned above, managing accesses to data in circular buffers may facilitate parallel processing of iterative sequences of operations and reuse of stored data during executing of the iterative sequences of operations. FIG. 16 illustrates an embodiment of a method 1600 of performing an N tap LMS adaptive FIR filter using memory load instructions employing circular sliding, which facilitates parallel execution of iteration steps and sharing of data between steps of an iteration and between iterations. The method of FIG. 16 may be performed, for example, under the control of a processing core 102 of FIG. 1, using the circular buffer access manager 120 to access one or more circular buffers 110a to 110j. For convenience, FIG. 16 will be described with reference to FIGS. 1-15.

As discussed in more detail below, an iteration n of the method 1600 is reorganized as compared to a conventional FIR filter implementation and comprises:

(1) Determine the error of the (n)th iteration, e.g., according to $e_n=r[n]-y[n]$;

(2) Update the coefficients of the (n+1)th iteration, e.g., according to:

$B_{n+1}(k)=b_n(k)+e_n*x(n-k)$ ///k=0,1, . . . ,N−1; and (3) Perform the FIR calculation of the (n+1)th iteration, e.g., according to:

$y[n+1]=b_{n+1}[k]*x[n-k+1]$

The reorganization brings two potential benefits. First, parallelism may be employed as the calculation of y[n] does not need to wait until the $b_n$ calculations are finished. Second, the y[n] and bn calculations share most of the input values x[n−1], x[n−2], . . . x[n−6]. Loading the data into the circular buffer with circular sliding addresses a sample delay in the iterations with respect to the coefficients and the FIR result.

The method 1600 begins at 1602 and proceeds to 1604. At 1604, a LMS Adaptive FIR filter routine is called, for example, by an application executing on one of the processing cores 102, such as processing of a received signal or sensor samples to generate an output signal (e.g., decoding a received signal; generating a control signal to control a traction motor based on signals received from an encoder, etc.). The method 1600 proceeds from 1604 to 1606.

Due to the reorganization of the iterations, the initial FIR result y[0] needs to be generated prior to the iterations. At 1606, the initial input data (e.g., x[0] to x[7]) is loaded into a circular buffer (e.g., circular buffer 210 of FIGS. 7 and 8). This may be done, for example, by using one or more Idcs commands having an address offset indicating no sliding of the data is to be performed. For example, the Idcs commands discussed above with respect to FIGS. 7 and 8 may be employed to load the initial data into the circular buffer. The method proceeds from 1606 to 1608. At 1608, the method 1600 generates an initial FIR result y[0]. This may be done in a conventional manner using a MAC function of a digital signal processor. For example, a conventional MAC function having the following mnemonic and semantic representations may be employed:

mac ACC, {% rx0, % rx1, % rx2, % rx3}, {% ry0, % ry1, % ry2, % ry3}

$$ACC = ACC + \sum_{k=0}^{3} rx(k) * ry(k).$$

The method 1600 proceeds from 1608 to 1610, where the method 1600 initializes the address offset used with the memory load instructions to a value used for a first iteration of the method 1600. For example, the address offset may be initialized to a value indicating the data is aligned before being stored in a circular buffer. For example, with reference to FIGS. 7 and 8, the offset address may be initialized to 0x0. The method 1600 proceeds from 1610 to 1612.

At 1612, the method 1600 determines the error $e_n$ for an iteration n, which may be performed in a conventional manner. For example, the result y[n] may be compared or combined with (e.g., subtracted from) a reference signal r[n]. The method 1600 proceeds from 1612 to 1614.

At 1614, the method 1600 loads input data into a subset of buffers of the circular buffer. The may be done, for example, by executing an Idcs operation according to embodiments of the methods of FIGS. 4 and 5 using the buffer, offset and subset parameters. The method 1600 proceeds from 1614 to 1616. In some cases (e.g., when the offset parameter indicates the data is aligned with a subset), an additional load instruction may be employed to load the data value x(−1), when this value is not stored in the circular by a prior Idcs operation.

At 1616, the method 1600 uses the data loaded into the circular buffer to update the coefficients $b_{n+1}$, for example, using an MLA function of a digital signal processor, stores the updated coefficients, and generates the result y[n+1], for example, using a MAC function as discussed above. The MLA function may be a conventional MLA function having the following mnemonic and semantic representations:

mla {% rd0, % rd1, % rd2, % rd3}, {% rs0, % rs1, % rs2, % rs3}, % rs4 rd0=round(rd0+rs0*rs4)

rd1=round(rd1+rs1*rs4)

rd2=round(rd2+rs2*rs4)

rd3=round(rd3+rs3*rs4).

To account for the time delay, the input data used to update the coefficients in the MLA function may be obtained from the realigned subsets of registers and the input data used to generate the result signal in the MAC function may be obtained from the subsets of registers into which the circular buffer is organized. For example, with reference to FIGS. 9 and 10 where there is a misalignment of addresses of 0x4, the MLA function uses the data in the realigned subset of registers {r7, r0, r1, r2} or the data in the realigned subset of registers {r3, r4, r5, r6}, and the MAC function uses the data in the subset of registers subset 0 232 {r0, r1, r2, r3} or the data in the subset of registers subset 1 234 {r4, r5, r6, r7}

The method 1600 proceeds from 1616 to 1618, where the method determines whether there are more subsets of data to load into the circular buffer and process. When the method determines at 1618 that there are more subsets to load and process, the method 1600 increments the subset parameter and returns to 1614 to load the next subset of data for processing. When the method does not determine at 1618 that there are more subsets to load and process, the method 1600 increments the subset parameter and proceeds to 1620. For example, with reference to FIG. 2, the circular buffer 210 is organized into two subsets of buffers subset 0 232 and subset 1 234. When an Idcs having a subset parameter #Idx indicating subset 0 232 is executed at 1614, the method will determine at 1618 that there is an additional subset, subset 1 234, to load and process, and will return to 1614. When an Idcs having a subset parameter #Idx indicating subset 1 234 is executed at 1614, the method will not determine at 1618 that there is an additional subset to load and process, and will proceed to 1620.

At 1620, the method 1600 determines whether the iteration number n is equal to the number of taps N−1. When the method 1600 does not determine the iteration number n is equal to the number of taps N−1 at 1618 (No at 1620), the method 1600 increments n and returns to 1612 to perform the next iteration. When the method 1600 determines the iteration number n is equal to the number of taps N−1 at 1618 (Yes at 1618), the method 1600 proceeds to 1622, where the method 1600 increments the offset parameter, initializes n, and returns to 1612 to perform the next iteration. The size of the increment of the offset parameter is a function of the size of the data used in the LMS FIR filter. For example, with reference to FIG. 6, if the data size is one word, the increment of the offset parameter may be 0x4; if the data size is a half-word, the increment of the offset parameter may be 0x2.

Embodiments of the method 1600 of FIG. 16 may include more acts than illustrated, may contain fewer acts than illustrated, may combine or separate acts or perform acts in various orders. For example, act 1616 may be split into multiple acts in some embodiments. In another example, act 1622 may be omitted in some embodiments, for example, when the offset parameter is fixed.

In an embodiment, a device, comprises: a circular buffer, which, in operation, is organized into a plurality of subsets of buffers; and control circuitry coupled to the circular buffer, wherein the control circuitry, in operation, responds to receipt of a memory load command to load a set of data into the circular buffer, the memory load command having an offset parameter indicating a data offset and a subset parameter indicating a subset of the plurality of subsets into which the circular buffer is organized, by: identifying a set of buffer addresses of the circular buffer based on a value of the offset parameter and a value of the subset parameter; and loading the set of data into the circular buffer using the identified set of buffer addresses. In an embodiment, the circular buffer comprises a set of registers and the plurality of subsets of buffers comprise respective subsets of registers of the set of registers. In an embodiment, the device comprises a volatile memory including the set of registers. In an embodiment, the buffers of the circular buffer are registers, and the circular buffer is organized into a first subset of four registers and a second subset of four registers. In an embodiment, the registers are 32-bit registers and the set of data comprises four 32-bit words. In an embodiment, the device comprises: a second circular buffer, which, in operation, is organized into a plurality of subsets of buffers, wherein the control circuitry is coupled to the second circular buffer, the memory load, command includes a buffer parameter identifying a destination circular buffer and the control circuitry, in operation, responds to receipt of a memory load command having a buffer parameter identifying the second circular buffer by loading a set of data into the second circular buffer. In an embodiment, buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter. In an embodiment, in response to the comparing indicating alignment of the value of the offset parameter and the address of the starting buffer of the subset of buffers indicated by the subset parameter, the control circuitry identifies addresses of the buffers of the subset of buffers indicated by the subset parameter as the identified set of buffer addresses. In an embodiment, wherein: in response to the comparing indicating mis-alignment of the value of the offset parameter and the address of the starting buffer of the subset of buffers indicated by the subset parameter, the identifying the set of buffer addresses comprises subtracting the value of the offset parameter from respective addresses of the buffers of the subset of buffers indicated by the subset parameter. In an embodiment, the device, in operation, implements a finite impulse response (FIR) filter using the circular buffer to store input data to the FIR filter.

In an embodiment, a system comprises: a processing core; and a memory coupled to the processing core, the memory having a set of registers, which, in operation, are organized into a circular buffer having a plurality of subset of buffers, wherein the memory, in operation responds to receipt of a memory load command from the processing core to load a set of data into the circular buffer, the memory load command having an offset parameter indicating a data offset and a subset parameter indicating a subset of the plurality of subsets of buffers into which the circular buffer is organized, by: identifying a set of buffer addresses of the circular buffer based on a value of the offset parameter and a value of the subset parameter; and loading the set of data into the circular buffer using the identified set of buffer addresses. In an embodiment, the circular buffer is organized into a first subset of four registers and a second subset of four registers. In an embodiment, the registers are 32-bit registers and the set of data comprises four 32-bit words. In an embodiment, buffer addresses of the buffers of the circular buffer are indexed in a first circular direction, the subsets of the plurality of subsets have respective starting buffer addresses, the value of the offset parameter is a buffer address and the identifying the set of buffer addresses of the circular buffer comprises comparing the value of the offset parameter with a buffer address of the starting buffer of the subset of buffers indicated by the subset parameter. In an embodiment, in response to the comparing indicating alignment of the value of the offset parameter and the address of the starting buffer of the subset of buffers indicated by the subset parameter, the control circuitry identifies addresses of the buffers of the subset of buffers indicated by the subset parameter as the identified set of buffer addresses. In an embodiment, in response to the comparing indicating mis-alignment of the value of the offset parameter and the address of the starting buffer of the subset of buffers indicated by the subset parameter, the identifying the set of buffer addresses comprises subtracting the value of the offset parameter from respective addresses of the buffers of the subset of buffers indicated by the subset parameter.

In an embodiment, a method comprises: organizing a circular buffer into a plurality of subsets of buffers; and executing a memory load command to load a set of data into the circular buffer, the memory load command having an offset parameter indicating a data offset and a subset parameter indicating a subset of the plurality of subsets into which the circular buffer is organized, the executing the memory load command including: identifying a set of buffer addresses of the circular buffer based on a value of the offset parameter and a value of the subset parameter; and loading the set of data into the circular buffer using the identified set of buffer addresses. In an embodiment, the buffers of the circular buffer are registers, and the circular buffer is organized into a first subset of four registers and a second subset of four registers. In an embodiment, the registers are 32-bit registers and the set of data comprises four 32-bit words. In an embodiment, the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter. In an embodiment, the method comprises: in response to the comparing indicating alignment of the value of the offset parameter and the address of the starting buffer of the subset of buffers indicated by the subset parameter, identifying addresses of the buffers of the subset of buffers indicated by the subset parameter as the identified set of buffer addresses. In an embodiment, the method comprising: in response to the comparing indicating mis-alignment of the value of the offset parameter and the address of the starting buffer of the subset of buffers indicated by the subset parameter, subtracting the value of the offset parameter from respective addresses of the buffers of the subset of buffers indicated by the subset parameter. In an embodiment, the method comprises implementing a finite impulse response (FIR) filter, wherein the set of data is input data to the FIR filter.

In an embodiment, a non-transitory computer-readable medium's contents configure a processing device to perform a method, the method comprising: organizing a circular buffer into a plurality of subsets of buffers; and executing a memory load command to load a set of data into the circular buffer, the memory load command having an offset parameter indicating a data offset and a subset parameter indicating a subset of the plurality of subsets into which the circular buffer is organized, the executing the memory load command including: identifying a set of buffer addresses of the circular buffer based on a value of the offset parameter and a value of the subset parameter; and loading the set of data into the circular buffer using the identified set of buffer addresses. In an embodiment, the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter. In an embodiment, the contents comprise instructions, which, when executed by the processing device, cause the processing device to perform the method.

In an embodiment, a method comprises: organizing a circular buffer into a plurality of subsets of buffers; and filtering a sequence of data samples, the filtering including iteratively: generating an error signal; executing a load command to load a subset of data of the sequence of data into the circular buffer, the load command having an offset parameter indicating a data offset and a subset parameter indicating a subset of the plurality of subsets into which the circular buffer is organized, the executing the load command including: identifying a set of buffer addresses of the circular buffer based on a value of the offset parameter and a value of the subset parameter; and loading the subset of data of the sequence of data into the circular buffer using the identified set of buffer addresses; updating filter coefficients based on data stored in the circular buffer; and generating an output signal based on data stored in the circular buffer. In an embodiment, the buffers of the circular buffer are registers, and the circular buffer is organized into a first subset of four registers and a second subset of four registers. In an embodiment, the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter. In an embodiment, the method comprising: in response to the comparing indicating alignment of the value of the offset parameter and the address of the starting buffer of the subset of buffers indicated by the subset parameter, identifying addresses of the buffers of the subset of buffers indicated by the subset parameter as the identified set of buffer addresses. In an embodiment, the method comprises: in response to the comparing indicating mis-alignment of the value of the offset parameter and the address of the starting buffer of the subset of buffers indicated by the subset parameter, subtracting the value of the offset parameter from respective addresses of the buffers of the subset of buffers indicated by the subset parameter. In an embodiment, the filtering comprises implementing a finite impulse response (FIR) filter.

In an embodiment, a device comprises: memory and processing circuitry coupled to the memory. The processing circuitry, in operation, organizes the memory into a circular buffer having a plurality of subsets of buffers and filters a sequence of data samples. The filtering includes iteratively: generating an error signal; executing a load command to load a subset of data samples of the sequence of data samples into the circular buffer, the load command having an offset parameter indicating a data offset and a subset parameter indicating a subset of the plurality of subsets into which the circular buffer is organized, the executing the load command including: identifying a set of buffer addresses of the circular buffer based on a value of the offset parameter and a value of the subset parameter; and loading the subset of data samples of the sequence of data samples into the circular buffer using the identified set of buffer addresses; updating filter coefficients based on data samples stored in the circular buffer; and generating an output signal based on data samples stored in the circular buffer. In an embodiment, the memory comprises a plurality of registers, the buffers of the circular buffer are registers of the plurality of registers, and the circular buffer is organized into a first subset of registers of the plurality of registers and a second subset of registers of the plurality of registers. In an embodiment, the circular buffer includes eight registers of the plurality of registers, the first subset of registers of the plurality of registers includes four registers of the plurality of registers and the second subset of registers includes four registers of the plurality of registers. In an embodiment, the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter. In an embodiment, the processing circuitry, in operation: in response to the comparing indicating alignment of the value of the offset parameter and the address of the starting buffer of the subset of buffers indicated by the subset parameter, identifies addresses of the buffers of the subset of buffers indicated by the subset parameter as the identified set of buffer addresses. In an embodiment, the processing circuitry, in operation: in response to the comparing indicating mis-alignment of the value of the offset parameter and the address of the starting buffer of the subset of buffers indicated by the subset parameter, subtracts the value of the offset parameter from respective addresses of the buffers of the subset of buffers indicated by the subset parameter. In an embodiment, the filtering comprises implementing a finite impulse response (FIR) filter. In an embodiment, an iteration of the filtering includes executing a plurality of load commands.

In an embodiment, a system comprises a processing core and a memory coupled to the processing core, the memory having a set of registers. The processing core, in operation: organizes the set of registers into a circular buffer having a plurality of subsets of buffers and filters a sequence of data samples. The filtering includes iteratively: generating an error signal; executing a load command to load a subset of data samples of the sequence of data samples into the circular buffer, the load command having an offset parameter indicating a data offset and a subset parameter indicating a subset of the plurality of subsets into which the circular buffer is organized, the executing the load command including: identifying a set of buffer addresses of the circular buffer based on a value of the offset parameter and a value of the subset parameter; and loading the subset of data samples of the sequence of data samples into the circular buffer using the identified set of buffer addresses; updating filter coefficients based on data samples stored in the circular buffer; and generating an output signal based on data samples stored in the circular buffer. In an embodiment, buffer addresses of the buffers of the circular buffer are indexed in a first circular direction, the subsets of the plurality of subsets have respective starting buffer addresses, the value of the offset parameter is a buffer address and the identifying the set of buffer addresses of the circular buffer comprises comparing the value of the offset parameter with a buffer address of the starting buffer of the subset of buffers indicated by the subset parameter. In an embodiment, in response to the comparing indicating alignment of the value of the offset parameter and the address of the starting buffer of the subset of buffers indicated by the subset parameter, the processing core identifies addresses of the buffers of the subset of buffers indicated by the subset parameter as the identified set of buffer addresses. In an embodiment, in response to the comparing indicating mis-alignment of the value of the offset parameter and the address of the starting buffer of the subset of buffers indicated by the subset parameter, the identifying the set of buffer addresses comprises subtracting the value of the offset parameter from respective addresses of the buffers of the subset of buffers indicated by the subset parameter. In an embodiment, the filtering comprises implementing a finite impulse response (FIR) filter.

In an embodiment, a non-transitory computer-readable medium's contents configure a processing device to perform a method, the method, comprising: organizing a circular buffer into a plurality of subsets of buffers; and filtering a sequence of data samples, the filtering including iteratively: generating an error signal; executing a load command to load a subset of data samples of the sequence of data samples into the circular buffer, the load command having an offset parameter indicating a data offset and a subset parameter indicating a subset of the plurality of subsets into which the circular buffer is organized, the executing the load command including: identifying a set of buffer addresses of the circular buffer based on a value of the offset parameter and a value of the subset parameter; and loading the subset of data samples of the sequence of data into the circular buffer using the identified set of buffer addresses; updating filter coefficients based on data samples stored in the circular buffer; and generating an output signal based on data samples stored in the circular buffer. In an embodiment, the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter. In an embodiment, the filtering comprises implementing a finite impulse response (FIR) filter. In an embodiment, the contents comprise instructions executed by the processing device.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a circular buffer, which, in operation, is organized into a plurality of subsets of buffers; and
control circuitry coupled to the circular buffer, wherein the control circuitry, in operation, responds to receipt of a memory load command to load a set of data into the circular buffer, the memory load command having an offset parameter indicating a data offset and a subset parameter indicating a subset of the plurality of subsets into which the circular buffer is organized, by:
identifying a set of buffer addresses of the circular buffer based on a value of the offset parameter and a value of the subset parameter; and
loading the set of data into the circular buffer using the identified set of buffer addresses.

2. The device of claim 1, wherein the circular buffer comprises a set of registers and the plurality of subsets of buffers comprise respective subsets of registers of the set of registers.

3. The device of claim 2, comprising a volatile memory including the set of registers.

4. The device of claim 2, wherein the buffers of the circular buffer are registers, and the circular buffer is organized into a first subset of four registers and a second subset of four registers.

5. The device of claim 4, wherein the registers are 32-bit registers and the set of data comprises four 32-bit words.

6. The device of claim 1, comprising:
a second circular buffer, which, in operation, is organized into a plurality of subsets of buffers, wherein the control circuitry is coupled to the second circular buffer, the memory load command includes a buffer parameter identifying a destination circular buffer and the control circuitry, in operation, responds to receipt of a memory load command having a buffer parameter identifying the second circular buffer by loading a set of data into the second circular buffer.

7. The device of claim 1, wherein buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter.

8. The device of claim 7, wherein:
in response to the comparing indicating alignment of the value of the offset parameter and the address of the starting buffer of the subset of buffers indicated by the subset parameter, the control circuitry identifies addresses of the buffers of the subset of buffers indicated by the subset parameter as the identified set of buffer addresses.

9. The device of claim 8, wherein:
in response to the comparing indicating mis-alignment of the value of the offset parameter and the address of the starting buffer of the subset of buffers indicated by the subset parameter, the identifying the set of buffer addresses comprises subtracting the value of the offset parameter from respective addresses of the buffers of the subset of buffers indicated by the subset parameter.

10. The device of claim 1, wherein, the device, in operation, implements a finite impulse response (FIR) filter using the circular buffer to store input data to the FIR filter.

11. A system, comprising:
a processing core; and
a memory coupled to the processing core, the memory having a set of registers, which, in operation, are organized into a circular buffer having a plurality of subset of buffers, wherein the memory, in operation responds to receipt of a memory load command from the processing core to load a set of data into the circular buffer, the memory load command having an offset parameter indicating a data offset and a subset parameter indicating a subset of the plurality of subsets of buffers into which the circular buffer is organized, by:
identifying a set of buffer addresses of the circular buffer based on a value of the offset parameter and a value of the subset parameter; and
loading the set of data into the circular buffer using the identified set of buffer addresses.

12. The system of claim 11, wherein the circular buffer is organized into a first subset of four registers and a second subset of four registers.

13. The system of claim 12, wherein the registers are 32-bit registers and the set of data comprises four 32-bit words.

14. The system of claim 11, wherein buffer addresses of the buffers of the circular buffer are indexed in a first circular direction, the subsets of the plurality of subsets have respective starting buffer addresses, the value of the offset parameter is a buffer address and the identifying the set of buffer addresses of the circular buffer comprises comparing the value of the offset parameter with a buffer address of the starting buffer of the subset of buffers indicated by the subset parameter.

15. A method, comprising:
organizing a circular buffer into a plurality of subsets of buffers; and
executing a memory load command to load a set of data into the circular buffer, the memory load command having an offset parameter indicating a data offset and a subset parameter indicating a subset of the plurality of subsets into which the circular buffer is organized, the executing the memory load command including:
identifying a set of buffer addresses of the circular buffer based on a value of the offset parameter and a value of the subset parameter; and
loading the set of data into the circular buffer using the identified set of buffer addresses.

16. The method of claim 15, wherein the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter.

17. The method of claim 15, comprising implementing a finite impulse response (FIR) filter, wherein the set of data is input data to the FIR filter.

18. A device, comprising:
memory; and
processing circuitry coupled to the memory, wherein the processing circuitry, in operation:
organizes the memory into a circular buffer having a plurality of subsets of buffers; and
filters a sequence of data samples, the filtering including iteratively:
generating an error signal;
executing a load command to load a subset of data samples of the sequence of data samples into the circular buffer, the load command having an offset parameter indicating a data offset and a subset parameter indicating a subset of the plurality of subsets into which the circular buffer is organized, the executing the load command including:
identifying a set of buffer addresses of the circular buffer based on a value of the offset parameter and a value of the subset parameter; and
loading the subset of data samples of the sequence of data samples into the circular buffer using the identified set of buffer addresses;
updating filter coefficients based on data samples stored in the circular buffer; and
generating an output signal based on data samples stored in the circular buffer.

19. The device of claim 18, wherein the memory comprises a plurality of registers, the buffers of the circular buffer are registers of the plurality of registers, and the circular buffer is organized into a first subset of registers of the plurality of registers and a second subset of registers of the plurality of registers.

20. The device of claim 19, wherein the circular buffer includes eight registers of the plurality of registers, the first subset of registers of the plurality of registers includes four registers of the plurality of registers and the second subset of registers includes four registers of the plurality of registers.

21. The device of claim 18, wherein the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter.

22. The device of claim 21, wherein the processing circuitry, in operation:
in response to the comparing indicating alignment of the value of the offset parameter and the address of the starting buffer of the subset of buffers indicated by the subset parameter, identifies addresses of the buffers of the subset of buffers indicated by the subset parameter as the identified set of buffer addresses.

23. The device of claim 21, wherein the processing circuitry, in operation:
in response to the comparing indicating mis-alignment of the value of the offset parameter and the address of the starting buffer of the subset of buffers indicated by the subset parameter, subtracts the value of the offset parameter from respective addresses of the buffers of the subset of buffers indicated by the subset parameter.

24. The device of claim 18, wherein the filtering comprises implementing a finite impulse response (FIR) filter.

25. The device of claim 18, wherein an iteration of the filtering includes executing a plurality of load commands.

26. The system of claim 14, wherein:
in response to the comparing indicating alignment of the value of the offset parameter and the address of the starting buffer of the subset of buffers indicated by the subset parameter, the processing core identifies addresses of the buffers of the subset of buffers indicated by the subset parameter as the identified set of buffer addresses.

27. The system of claim 14, wherein:
in response to the comparing indicating mis-alignment of the value of the offset parameter and the address of the starting buffer of the subset of buffers indicated by the subset parameter, the identifying the set of buffer addresses comprises subtracting the value of the offset parameter from respective addresses of the buffers of the subset of buffers indicated by the subset parameter.

28. The method of claim 15, wherein the buffers of the circular buffer are registers, and the circular buffer is organized into a first subset of four registers and a second subset of four registers.

29. The method of claim 28, wherein the registers are 32-bit registers and the set of data comprises four 32-bit words.

30. The method of claim 16, comprising:
in response to the comparing indicating alignment of the value of the offset parameter and the address of the starting buffer of the subset of buffers indicated by the subset parameter, identifying addresses of the buffers of the subset of buffers indicated by the subset parameter as the identified set of buffer addresses.

31. The method of claim 30, comprising:
in response to the comparing indicating mis-alignment of the value of the offset parameter and the address of the starting buffer of the subset of buffers indicated by the subset parameter, subtracting the value of the offset parameter from respective addresses of the buffers of the subset of buffers indicated by the subset parameter.

32. A non-transitory computer-readable medium having contents which configure a processing device to perform a method, the method comprising:
organizing a circular buffer into a plurality of subsets of buffers; and
executing a memory load command to load a set of data into the circular buffer, the memory load command having an offset parameter indicating a data offset and a subset parameter indicating a subset of the plurality of subsets into which the circular buffer is organized, the executing the memory load command including:
identifying a set of buffer addresses of the circular buffer based on a value of the offset parameter and a value of the subset parameter; and
loading the set of data into the circular buffer using the identified set of buffer addresses.

33. The non-transitory computer-readable medium of claim 32, wherein the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter.

34. The non-transitory computer-readable medium of claim 32, wherein the contents comprise instructions, which, when executed by the processing device, cause the processing device to perform the method.

35. A method, comprising:
organizing a circular buffer into a plurality of subsets of buffers; and
filtering a sequence of data samples, the filtering including iteratively:
generating an error signal;
executing a load command to load a subset of data samples of the sequence of data samples into the circular buffer, the load command having an offset parameter indicating a data offset and a subset parameter indicating a subset of the plurality of subsets into which the circular buffer is organized, the executing the load command including:
identifying a set of buffer addresses of the circular buffer based on a value of the offset parameter and a value of the subset parameter; and
loading the subset of data samples of the sequence of data into the circular buffer using the identified set of buffer addresses;
updating filter coefficients based on data samples stored in the circular buffer; and
generating an output signal based on data samples stored in the circular buffer.

36. The method of claim 35, wherein the buffers of the circular buffer are registers, and the circular buffer is organized into a first subset of four registers and a second subset of four registers.

37. The method of claim 35, wherein the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter.

38. The method of claim 37, comprising:
in response to the comparing indicating alignment of the value of the offset parameter and the address of the starting buffer of the subset of buffers indicated by the subset parameter, identifying addresses of the buffers of the subset of buffers indicated by the subset parameter as the identified set of buffer addresses.

39. The method of claim 37, comprising:
in response to the comparing indicating mis-alignment of the value of the offset parameter and the address of the starting buffer of the subset of buffers indicated by the subset parameter, subtracting the value of the offset parameter from respective addresses of the buffers of the subset of buffers indicated by the subset parameter.

40. The method of claim 35, wherein the filtering comprises implementing a finite impulse response (FIR) filter.

41. A system, comprising:
a processing core; and
a memory coupled to the processing core, the memory having a set of registers, wherein the processing core, in operation:
organizes the set of registers into a circular buffer having a plurality of subsets of buffers; and
filters a sequence of data samples, the filtering including iteratively:
generating an error signal;
executing a load command to load a subset of data samples of the sequence of data samples into the circular buffer, the load command having an offset parameter indicating a data offset and a subset parameter indicating a subset of the plurality of subsets into which the circular buffer is organized, the executing the load command including:
  identifying a set of buffer addresses of the circular buffer based on a value of the offset parameter and a value of the subset parameter; and
  loading the subset of data samples of the sequence of data samples into the circular buffer using the identified set of buffer addresses;
updating filter coefficients based on data samples stored in the circular buffer; and
generating an output signal based on data samples stored in the circular buffer.

42. The system of claim 41, wherein buffer addresses of the buffers of the circular buffer are indexed in a first circular direction, the subsets of the plurality of subsets have respective starting buffer addresses, the value of the offset parameter is a buffer address and the identifying the set of buffer addresses of the circular buffer comprises comparing the value of the offset parameter with a buffer address of the starting buffer of the subset of buffers indicated by the subset parameter.

43. The system of claim 42, wherein:
in response to the comparing indicating alignment of the value of the offset parameter and the address of the starting buffer of the subset of buffers indicated by the subset parameter, the processing core identifies addresses of the buffers of the subset of buffers indicated by the subset parameter as the identified set of buffer addresses.

44. The system of claim 42, wherein:
in response to the comparing indicating mis-alignment of the value of the offset parameter and the address of the starting buffer of the subset of buffers indicated by the subset parameter, the identifying the set of buffer addresses comprises subtracting the value of the offset parameter from respective addresses of the buffers of the subset of buffers indicated by the subset parameter.

45. The system of claim 41, wherein the filtering comprises implementing a finite impulse response (FIR) filter.

46. A non-transitory computer-readable medium having contents with configure a processing device to perform a method, the method, comprising:
organizing a circular buffer into a plurality of subsets of buffers; and
filtering a sequence of data samples, the filtering including iteratively:
  generating an error signal;
  executing a load command to load a subset of data samples of the sequence of data samples into the circular buffer, the load command having an offset parameter indicating a data offset and a subset parameter indicating a subset of the plurality of subsets into which the circular buffer is organized, the executing the load command including:
    identifying a set of buffer addresses of the circular buffer based on a value of the offset parameter and a value of the subset parameter; and
    loading the subset of data samples of the sequence of data into the circular buffer using the identified set of buffer addresses;
  updating filter coefficients based on data samples stored in the circular buffer; and
  generating an output signal based on data samples stored in the circular buffer.

47. The non-transitory computer-readable medium of claim 46, wherein the buffer addresses of the buffers of the circular buffer are indexed in a first circular direction, the subsets of the plurality of subsets have respective starting buffers, the value of the offset parameter is a buffer address and the identifying the set of buffer addresses of the circular buffer comprises comparing the value of the offset parameter with a buffer address of the starting buffer of the subset of buffers indicated by the subset parameter.

48. The non-transitory computer-readable medium of claim 47, wherein the filtering comprises implementing a finite impulse response (FIR) filter.

49. The non-transitory computer-readable medium of claim 46, wherein the contents comprise instructions executed by the processing device.

* * * * *